US012603758B2

(12) United States Patent
Lee

(10) Patent No.: US 12,603,758 B2
(45) Date of Patent: *Apr. 14, 2026

(54) METHOD, APPARATUS, AND COMPUTER PROGRAM FOR SETTING ENCRYPTION KEY IN WIRELESS COMMUNICATION SYSTEM, AND RECORDING MEDIUM FOR SAME

(71) Applicant: INTELLECTUAL DISCOVERY CO., LTD., Seoul (KR)

(72) Inventor: Jeaho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 53 days.

This patent is subject to a terminal disclaimer.

(21) Appl. No.: 18/816,933

(22) Filed: Aug. 27, 2024

(65) Prior Publication Data

US 2024/0430671 A1     Dec. 26, 2024

Related U.S. Application Data

(63) Continuation of application No. 17/774,966, filed as application No. PCT/KR2020/015364 on Nov. 5, 2020, now Pat. No. 12,108,247.

(30) Foreign Application Priority Data

Nov. 7, 2019     (KR) ........................ 10-2019-0141551

(51) Int. Cl.
*H04L 29/06*     (2006.01)
*H04L 9/06*      (2006.01)
(Continued)

(52) U.S. Cl.
CPC ............ *H04L 9/0631* (2013.01); *H04L 9/088* (2013.01); *H04W 12/0433* (2021.01); *H04L 2209/80* (2013.01)

(58) Field of Classification Search
CPC ... H04L 9/0631; H04L 9/088; H04L 2209/80; H04L 9/001; H04L 9/0637; H04L 9/12;
(Continued)

(56) References Cited

U.S. PATENT DOCUMENTS 6,965,992 B1 * 11/2005 Joseph ................. H04L 9/0866
                                                            713/153
9,207,866 B2    12/2015 Boeuf et al.
(Continued)

FOREIGN PATENT DOCUMENTS

CN        103493058 A      1/2014
JP        2002-16594 A     1/2002
KR    10-2016-0029590 A    3/2016

OTHER PUBLICATIONS

Extended European Search Report issued Nov. 2, 2023 in European Application No. 20884763.2.
(Continued)

*Primary Examiner* — Harunur Rashid
(74) *Attorney, Agent, or Firm* — Sughrue Mion, PLLC

(57) ABSTRACT

The present disclosure relates to a method, apparatus, and computer program for setting an encryption key in a wireless communication system; and a recording medium for same. According to one embodiment of the present disclosure, a method for setting an encryption key size in a wireless communication system may comprise: a step in which a first controller of a first device receives a first message containing information on a minimum value of a first encryption key size from a first host of the first device; and a step in which the first controller transmits, to the first host, a second message indicating an encryption change. The second message may contain information on the first encryption key size.

4 Claims, 28 Drawing Sheets

(51) Int. Cl.
    *H04L 9/08*        (2006.01)
    *H04W 12/0433*    (2021.01)

(58) Field of Classification Search
    CPC ........................ H04L 9/0866; H04W 12/0433;
            H04W 12/50; H04W 84/18; H04W 12/03;
            H04W 12/67; H04W 4/80; H04S 3/008
    See application file for complete search history.

(56) References Cited

U.S. PATENT DOCUMENTS

| | | | |
|---|---|---|---|
| 10,075,754 B2 * | 9/2018 | Sheehan ............ | H04N 21/2221 |
| 10,078,754 B1 | 9/2018 | Brandwine et al. | |
| 2008/0082835 A1 | 4/2008 | Asher et al. | |
| 2010/0303236 A1 * | 12/2010 | Laaksonen ............ | H04W 12/50 |
| | | | 380/283 |
| 2011/0003548 A1 * | 1/2011 | Malcolmson ......... | H04W 12/06 |
| | | | 455/41.2 |
| 2016/0149865 A1 | 5/2016 | Antonakakis et al. | |
| 2017/0154522 A1 * | 6/2017 | Lim ........................ | G08C 17/02 |
| 2017/0163414 A1 * | 6/2017 | Moon ................... | H04L 9/0618 |
| 2017/0180342 A1 | 6/2017 | Hamachi | |
| 2017/0195297 A1 | 7/2017 | Nakano | |
| 2017/0201886 A1 | 7/2017 | Yang et al. | |
| 2018/0295660 A1 * | 10/2018 | Choi ..................... | H04W 76/14 |

OTHER PUBLICATIONS

"Specification of the Bluetooth System Wireless Connections Made Easy" Bluetooth Specification Version 3.0 +HS [vol. 0], Apr. 21, 2009, XP002628884 (1710 pages total).

Technical Committee on Sensor Technology (TC-9) of the IEEE Instrumentation and Measurement Society, "P1451.5/D1.1 Draft Standard for a Smart Transducer Interface for Sensors and Actuators—Wireless Communication Protocols and Transducer Electronic Data Sheet (TEDS) Formats", Feb. 2018 (240 pages total).

International Search Report for PCT/KR2020/015364, dated Feb. 18, 2021.

Su el al., "The Link Level Security Implementation of Bluetooth Technology" National Library of Canada, 0-612-78966-7, Aug. 2001, pp. 1-68 (Year: 2001).

Padgette el al.,"Guide to Bluetooth Security" https://doi.org/10.6028/NIST.SP.800-121r2-uod1, May 2017, p. 1-68 (Year: 2017).

Antonioli et al., "The Knob is Broken: Exploiting Low Entropy in the Encryption Key Negotiation of Bluetooth BR/EDR" USENIX Security Symposium, Aug. 2019, p. 1-15 (Year: 2019).

Scarfone et al., "Guide to Bluetooth Security" NIST Special Publication 800-121, Sep. 2008, p. 1-66 (Year: 2008).

Communication dated Dec. 20, 2024 in Chinese Application No. 202080084409.X.

\* cited by examiner

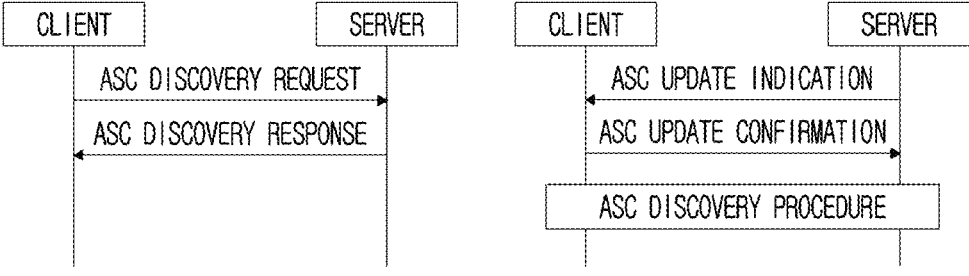
FIG. 14(a)                    FIG. 14(b)

FIG. 21(a)

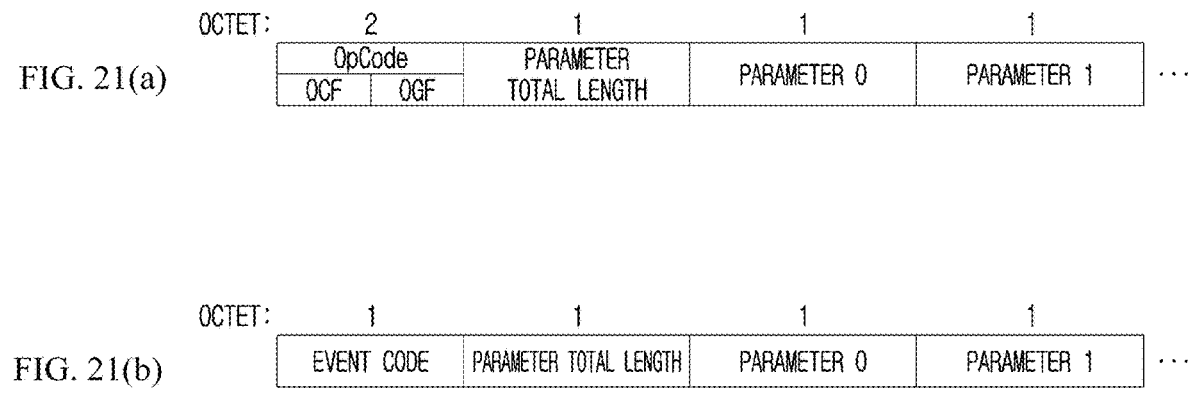

OCTET:            2                    1                      1                      1

| OpCode | | PARAMETER TOTAL LENGTH | PARAMETER 0 | PARAMETER 1 |
|---|---|---|---|---|
| OCF | OGF | | | |

OCTET:            1                    1                      1                      1

| EVENT CODE | PARAMETER TOTAL LENGTH | PARAMETER 0 | PARAMETER 1 |
|---|---|---|---|

METHOD, APPARATUS, AND COMPUTER PROGRAM FOR SETTING ENCRYPTION KEY IN WIRELESS COMMUNICATION SYSTEM, AND RECORDING MEDIUM FOR SAME

CROSS-REFERENCE TO RELATED APPLICATIONS

This is a Continuation of U.S. application Ser. No. 17/774, 966 filed May 6, 2022, which is a National Stage of International Application No. PCT/KR2020/015364 filed Nov. 5, 2020, claiming priorities based on Korean Application No. 10-2019-0141551, filed on Nov. 7, 2019, the contents of which are all hereby incorporated by reference herein in their entirety.

TECHNICAL FIELD

The present disclosure relates to a method, an apparatus, a computer program, and a recording medium thereof for encryption key configuration in a wireless communication system.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

An encryption key used in the conventional Bluetooth standard supports 8-bit to 128-bit size. However, the conventional encryption key size has a weak security problem due to its short length, so it is required to correct it.

DISCLOSURE

Technical Problem

A technical problem of the present disclosure is to provide a method and an apparatus for controlling an encryption key between a host related to a device and a controller in a wireless communication system.

An additional technical problem of the present disclosure is to provide a method and an apparatus for configuring an encryption key size between a host related to the device and a controller in a wireless communication system.

An additional technical problem of the present disclosure is to provide a method and apparatus in which a controller related to a device provides information on an encryption key size to a host in a wireless communication system.

The technical problems to be achieved in the present disclosure are not limited to the technical problems mentioned above, and other technical problems not mentioned will be clearly understood by those of ordinary skill in the art to which the present disclosure belongs from the following description.

Technical Solution

A method of configuring an encryption key size in a wireless communication system according to an aspect of the present disclosure may include receiving, by a first controller related to a first device, a first message including information on a minimum value of a first encryption key size from a first host related to the first device; and transmitting, by the first controller, a second message indicating an encryption change to the first host, and the second message may include information on the first encryption key size.

A first device for configuring an encryption key size in a wireless communication system may include a transceiver for performing signal transmission and reception with another device; and a processor for controlling the transceiver and the device. The processor may be configured to: cause a first controller related to the first device to receive a first message including information on a minimum value of a first encryption key size from a first host related to the first device; and cause the first controller to transmit a second message indicating an encryption change to the first host. The second message may include information on the first encryption key size.

The features briefly summarized above with respect to the present disclosure are merely exemplary aspects of the detailed description of the present disclosure that follows, and do not limit the scope of the present disclosure.

Technical Effects

According to the present disclosure, a method and an apparatus for controlling an encryption key between a host related to a device and a controller in a wireless communication system may be provided.

According to the present disclosure, a method and an apparatus for configuring an encryption key size between a host related to a host and a controller in a wireless communication system may be provided.

According to the present disclosure, a method and apparatus in which a controller related to a device provides information on an encryption key size to a host in a wireless communication system may be provided.

The technical effects of the present disclosure are not limited to the above-described effects, and other effects not mentioned herein may be understood to those skilled in the art from the following description.

BRIEF DESCRIPTION OF DRAWINGS

FIGS. 2(a) and 2(b) are diagrams exemplarily illustrating a conventional audio-related protocol and an audio-related protocol stack to which the present is applicable.

FIG. 3 is a diagram illustrating examples of 5.1 channel surround system hardware to which the present disclosure is applicable.

FIG. 8 and FIG. 9 are diagrams for describing the operation of the ICL type and the INCL type to which the present disclosure is applicable.

FIG. 13 is a diagram illustrating an example of an audio topology to which the present disclosure is applicable.

FIGS. 14(a) to 16(b) are diagrams illustrating a message exchange process between a server and a client to which the present disclosure is applicable.

FIGS. 21(a) and 21(b) show an exemplary HCI packet format to which this disclosure is applicable.

FIG. 28 is a diagram illustrating a configuration of a first device and a second device to which the present disclosure is applicable.

BEST MODE

Figures 1A, 1B:
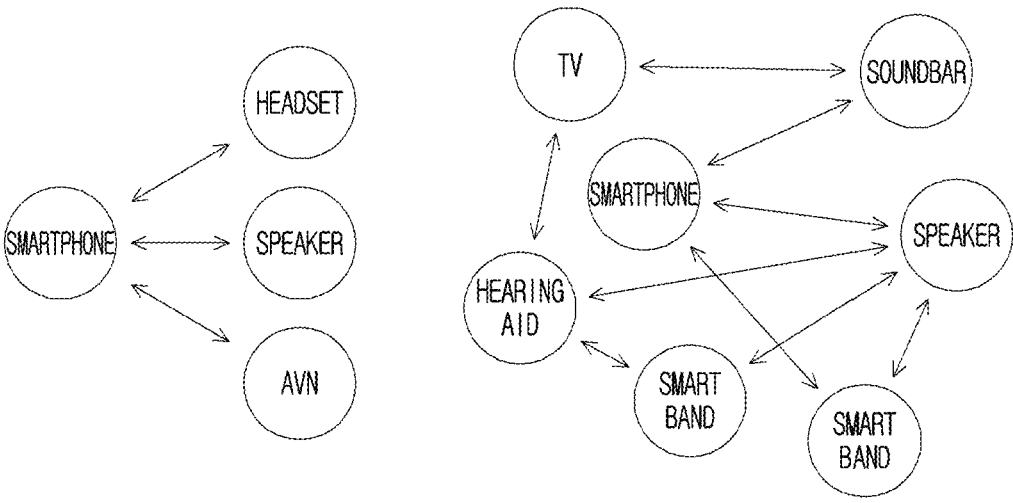
FIGS. 1(a) and 1(b) are diagrams exemplarily illustrating a conventional audio connection type and an audio connection type to which the present disclosure is applicable.

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure.

In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user. Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QOS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

FIGS. 1(a) and 1(b) are diagrams exemplarily illustrating a conventional audio connection type and an audio connection type to which the present disclosure is applicable.

FIG. 1(a) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

FIG. 1(b) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

Figures 2, 2A:
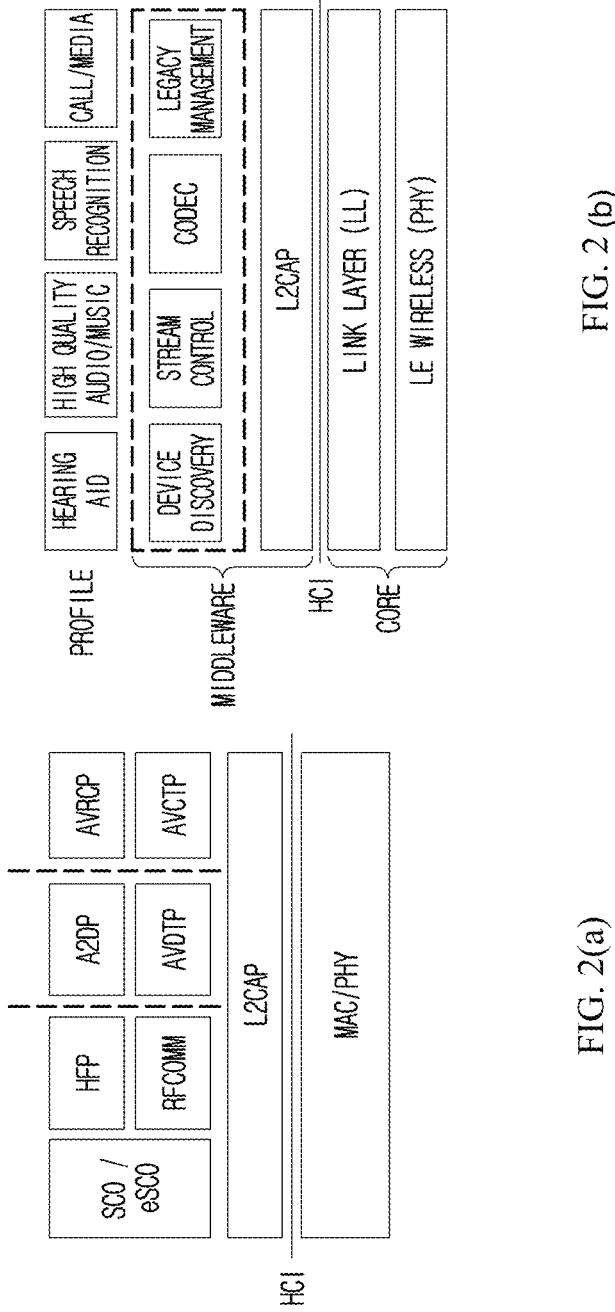

FIG. 2 is a diagram exemplarily illustrating a conventional audio-related protocol stack and an audio-related protocol stack to which the present disclosure is applicable.

FIG. 2(a) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc. and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCI (Host Controller Interface).

FIG. 2(*b*) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCI may be defined between the host and the controller.

In addition to the host profile and protocol illustrated in FIG. 2(*b*), the host may include an LE profile, a generic access profile (GAP), a generic attribute profile (GATT), an Attribute (ATT) protocol, a security manager (SM), and the like.

Information transmitted from a host to a controller may be referred to as a HCI command packet. Information transmitted from a controller to a host may be referred to as a HCI event packet. In addition, HCI asynchronous data packets or HCI synchronous data packets may be exchanged between a host and a controller.

Also, in addition to the middleware profiles and services illustrated in FIG. 2(*b*), the middleware may include various profiles and/or services as follows:

Audio Session Capability Service (ASCS): Audio Session Capability Service (ASCS) is a service that supports to advertise or discover capabilities related to an audio session;

Audio Stream Session Service (Audio Stream Session Service, ASSS): Audio Stream Session Service (ASSS) is a service that supports discovery, setup, establishment, control, and management related to an audio session;

Audio Input Management Service (AIMS): a service for managing audio input volume, etc.;

Audio Routing Service (ARS): a service for selecting the location of audio inputs and outputs;

Audio Middleware Profile (AMP): a basic profile for the behavior of a device to distribute audio;

Call Management Profile (CMP): a profile of the roles and procedures of interaction between two devices for a call;

Audio General Middleware Profile (AGMP): a basic profile that enables content and/or stream control;

Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1CH) audio, may be such examples:

Audio Player Management Profile (APMP): a profile that supports the control or interaction of an audio player;

Audio Player Management Service (APMS): a service that supports the control or interaction of an audio player;

Microphone Management Profile: a profile for microphone state management;

Microphone Management Service: a service that supports interfaces and states for microphone state management;

Quick Service Discovery Service (QSDS): a service that supports quick discovery of services such as audio player management and call management;

Call Bearer Service: a service that supports management of a call interface and a call state for a bearer on a device;

Volume Management Profile: a profile that supports audio volume management of a device;

Volume Management Service: a service that supports the device's audio volume interface and state;

Volume Offset Management Service: a service for volume management for audio output.

Figure 3:
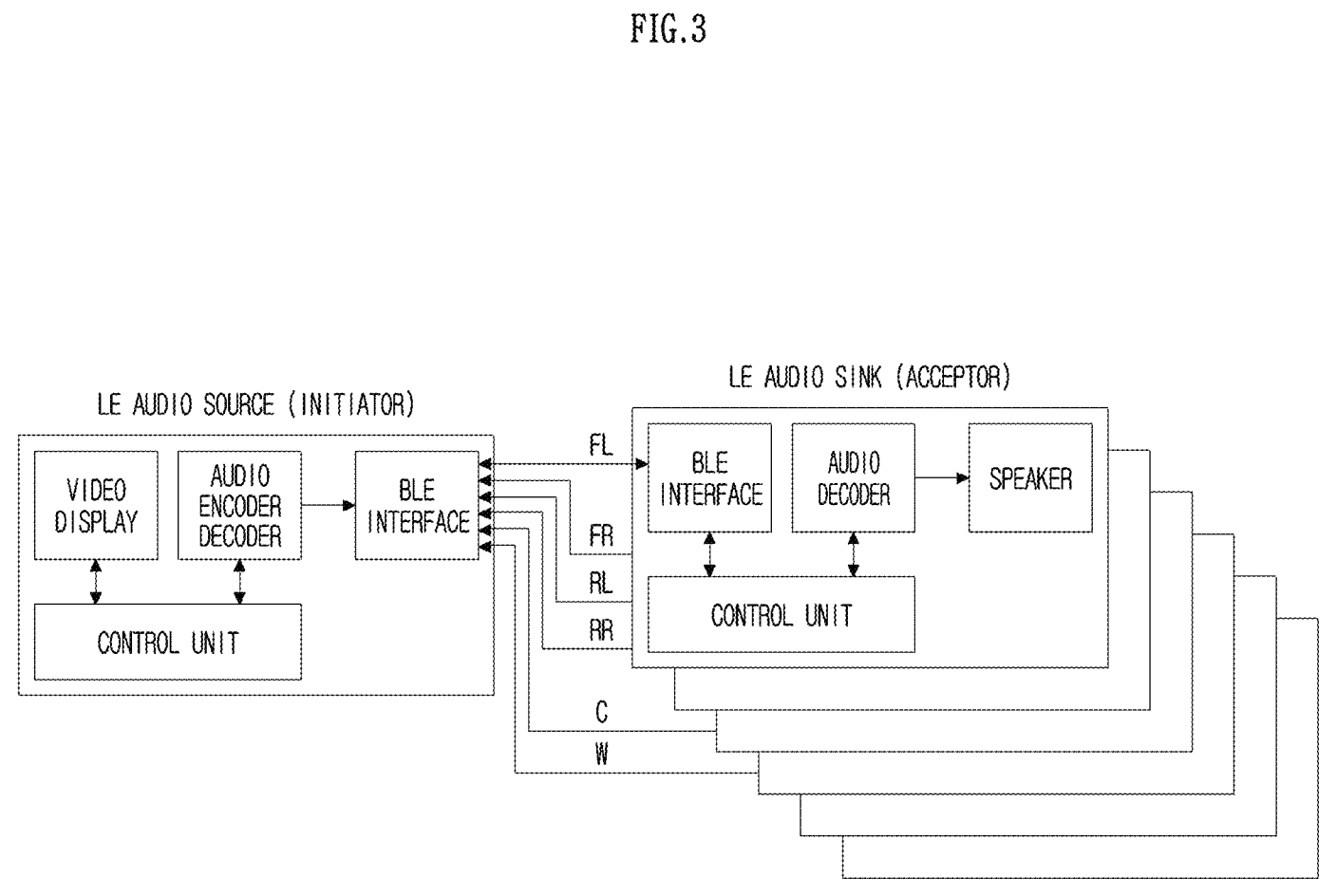

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session. Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

FIGS. 4(*a*) to 4(*c*) are diagrams illustrating an audio data encoding/decoding process to which the present disclosure is applicable.

Referring to FIG. 4(*a*), a DTS format stream or a Dolby 5.1CH format stream may be input to a DTS decoder or a Dolby 5.1CH decoder of the transmitting end (Tx) and an audio signal in a PCM (Pulse-Code Modulation) format may be output. The PCM signal may be input to the BLEAC encoder and output as an audio signal in the BLEAC format. Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a pluarlity of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1CH may be transmitted from a transmitting end to a receiving end, and a set of these six CBISs may be referred to as one CBISS (Connection Based Isochronous Steam Set).

Figures 4A, 4B, 4C:
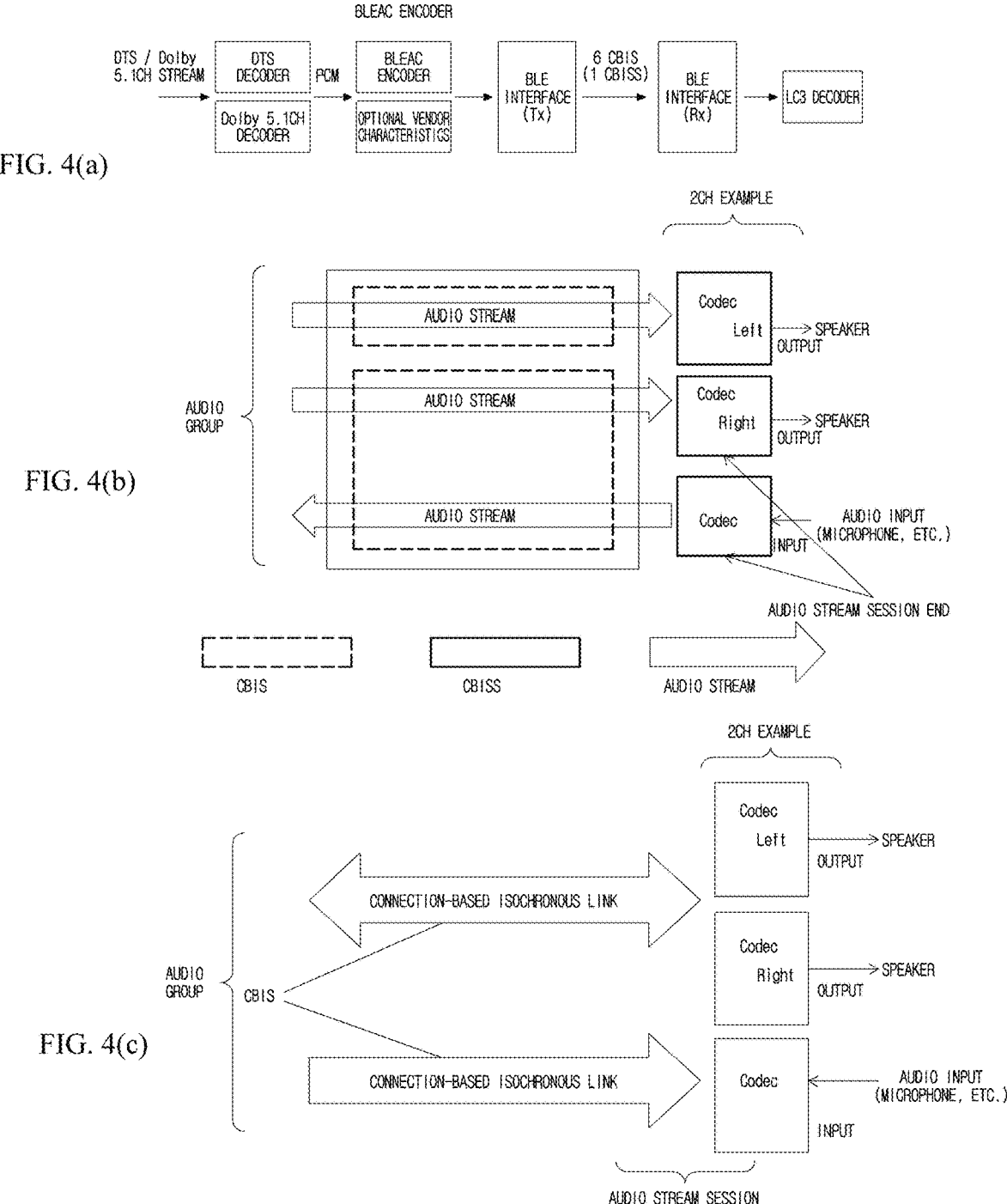
FIGS. 4(a) to 4(c) are diagrams illustrating an audio data encoding/decoding process to which the present disclosure is applicable.

FIGS. 4(b) and 4(c) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
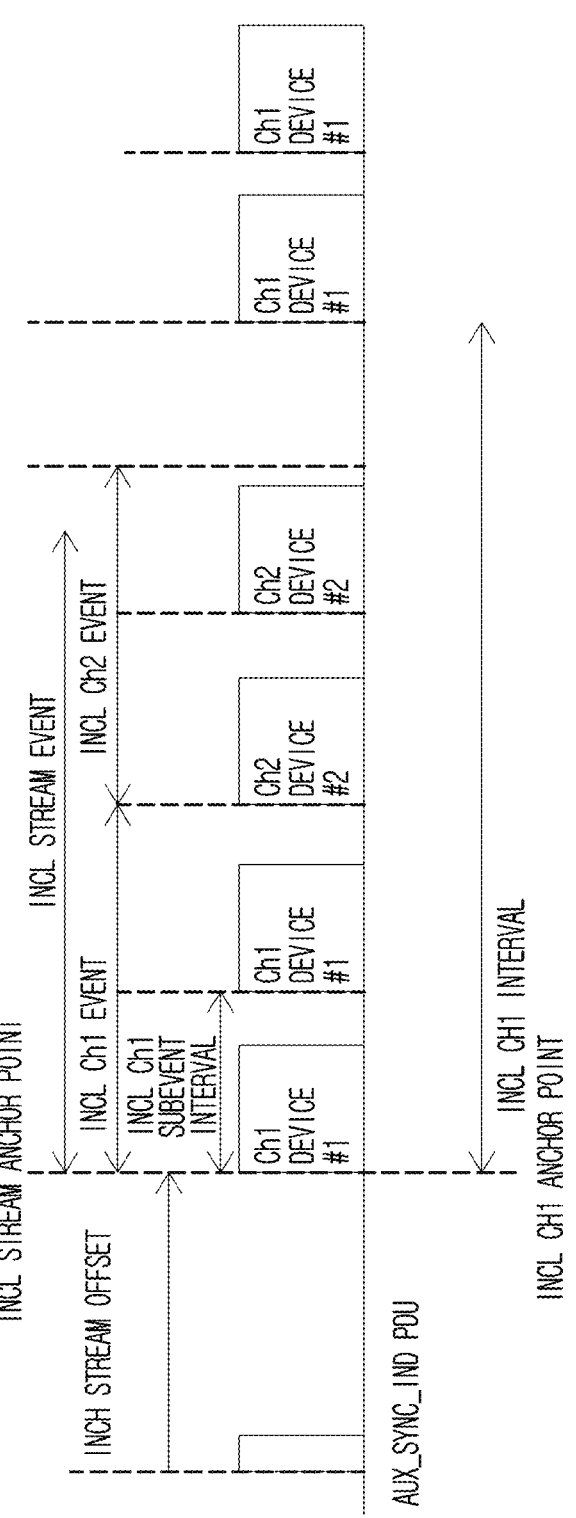
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
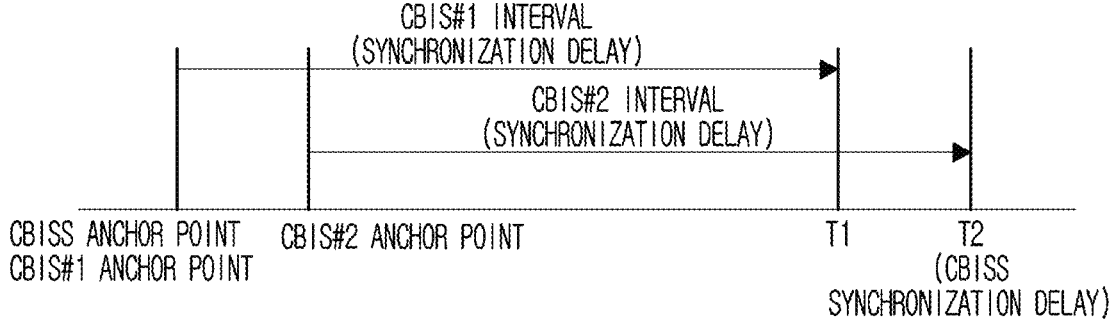
FIG. 6 is a diagram for describing a synchronization delay of two streams to which the present disclosure is applicable.

FIG. 6 is a diagram for describing a synchronization delay of two streams to which the present disclosure is applicable.

It is assumed that a pluarlity of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS #1) and the second stream (CBIS #2) may be required to be reproduced simultaneously, and may be included in one CBISS. The CBISS anchor point may be same as the anchor point of CBIS #1, and after the CBIS #1 audio data may be transmitted, CBIS #1 audio data subsequent to the time point (e.g., T1) after the CBIS #1 interval may be transmitted. Next, after CBIS #2 audio data is transmitted from the anchor point of CBIS #2, CBIS #2 audio data subsequent to a time point after the CBIS #2 interval (e.g., T2) may be transmitted. After all streams included in one CBISS are received, they may be reproduced simultaneously. That is, the audio data of CBIS #1 and CBIS #2 may be processed and reproduced at the time of completion of reception of CBIS #2, which is transmitted relatively late.

Here, the synchronization delay of the CBISS may be defined as a time interval until the reception completion time (T2) of CBIS #2, which is received relatively late from the CBISS. For example, the later time point among the reception completion time T1 of CBIS #1 and the reception completion time T2 of CBIS #2 may be determined as the synchronization delay of the CBISS. That is, a later reception completion time among synchronization delays of a plurality of streams may be determined as a synchronization delay of the CBISS. Specifically, when CBIS #1 and CBIS #2 are bundled into the same single CBISS, the previously received stream CBIS #1 may be reproduced after waiting until the received stream CBIS #2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1CH) are included in one CBISS, the transmitting end may receive feedback from the receiver to adjust synchronization. Through the feedback, the receiving end may inform the transmitting end of its delay information.

Figure 7:
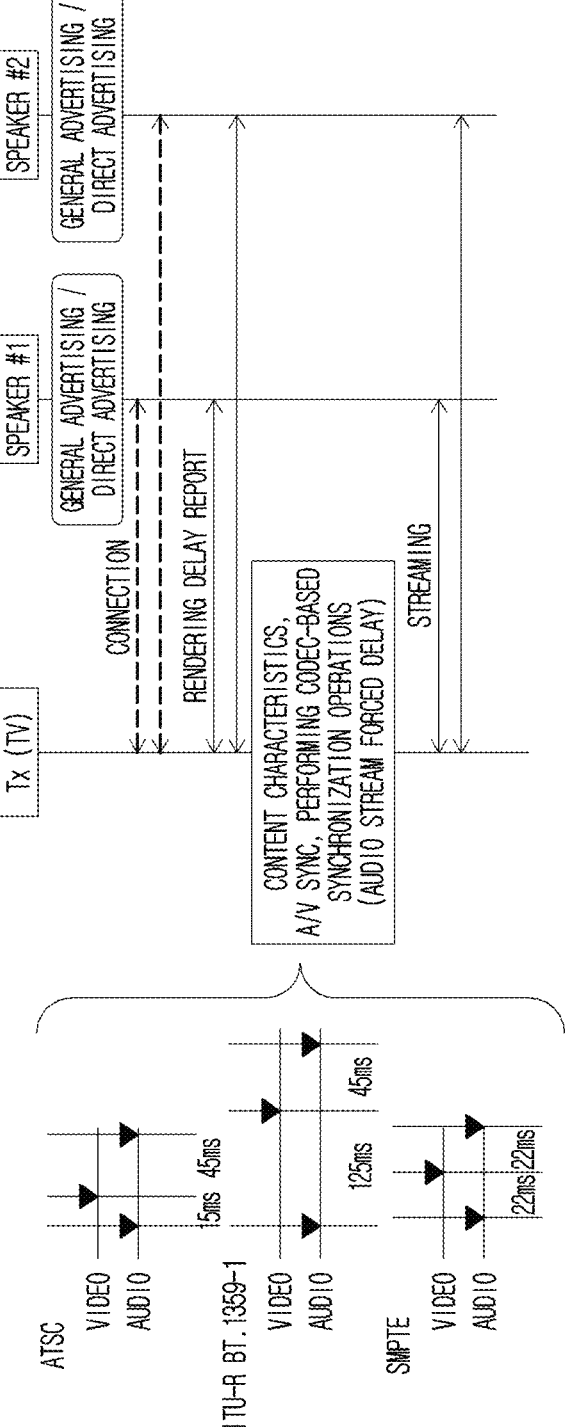
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1CH), and the second speaker may be allocated a second stream/channel (e.g., RL channel in 5.1CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, animations, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting standards. For example, the time interval between audio-video-audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmission timing of the stream based on the delay value provided from the speaker.

The TV may transmit a stream to the speaker based on the determined delay value. That is, the source device or the TV which is the transmitting end may exchange a delay value with the sink device and the speaker(s) which is the receiving end, and may perform an operation of synchronizing by reflecting the delay value.

Figure 8:
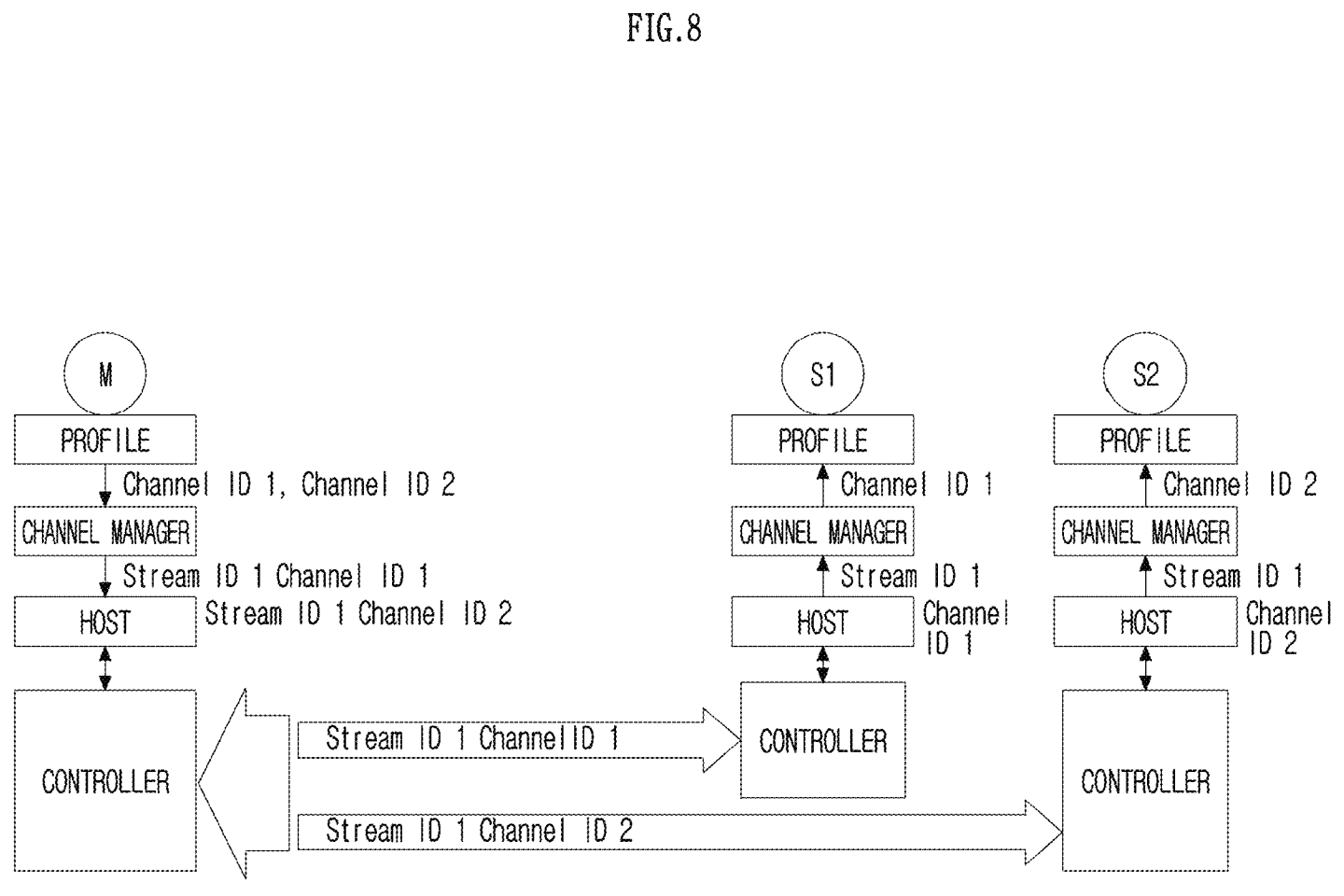
Figure 9:
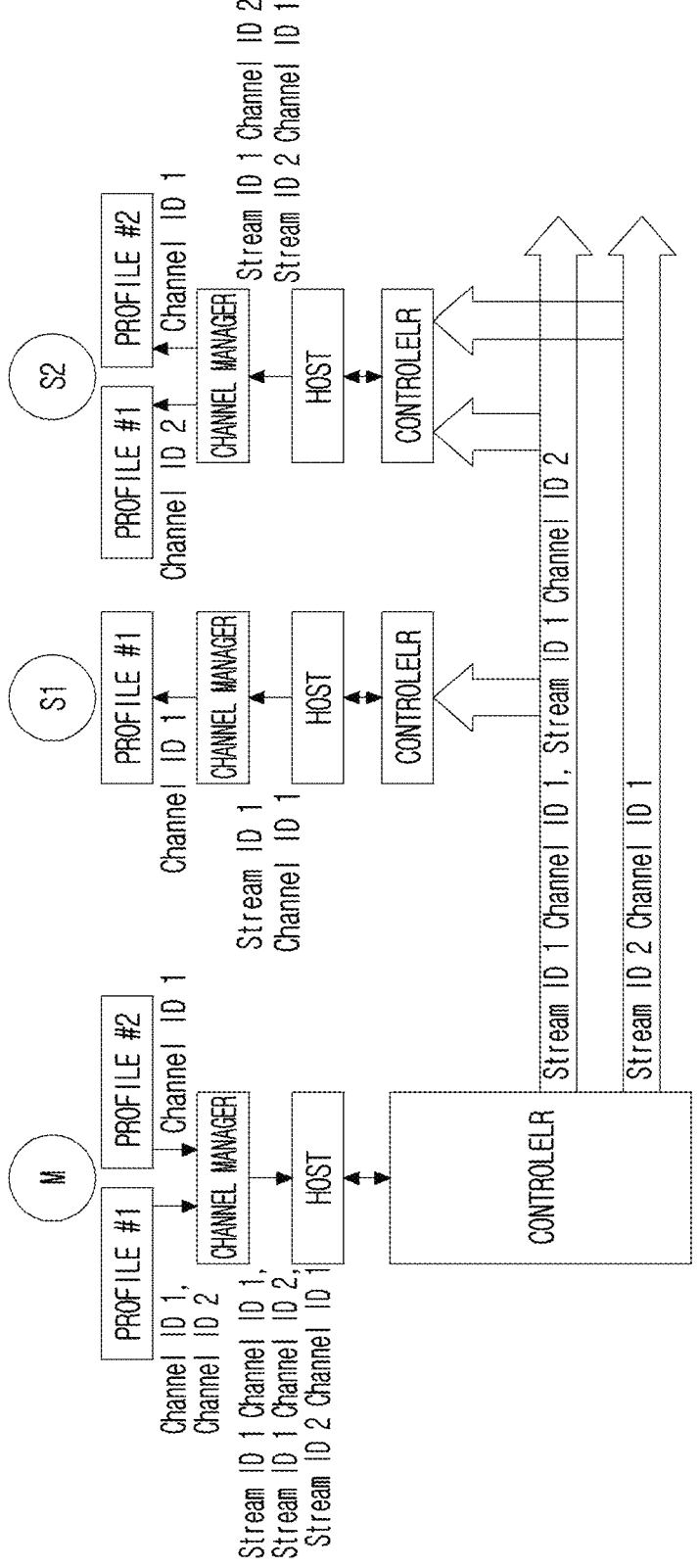

FIG. 8 and FIG. 9 are diagrams for describing the operation of a ICL type and a INCL type to which the present disclosure is applicable.

In BLE, a channel for audio transmission may be classified into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be transferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID 1. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchronization information advertised by the master and may receive broadcast audio data. In addition, the master M may include two profiles (profile #1 and profile #2). The first slave S1 may include the profile #1, and the second slave S 2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broadcast from the master M through Stream ID 2, and the second slave S2 may receive Channel ID 1 in profile #2.

Figure 10:
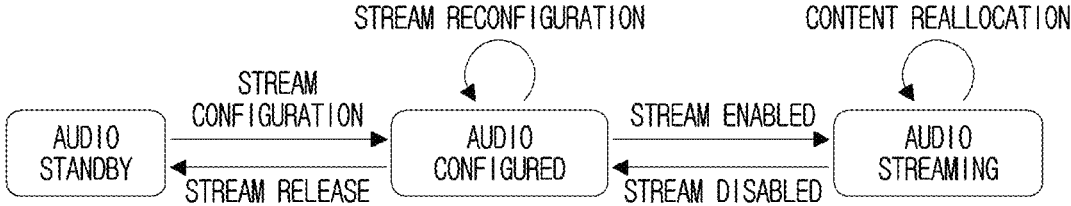
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broadcast receiver (or broadcast discovery client). The broadcast transmitter may communicate using a broadcast audio advertisement in the form of a Broadcast Audio Source Session (BASS). A broadcast audio stream may be transmitted by a broadcast transmitter.

The AUDIO STANDBY state means a state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertising event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmitter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reassignment occurs in the AUDIO STREAMING state, it may transition to the AUDIO STREAMING state.

Figure 11:
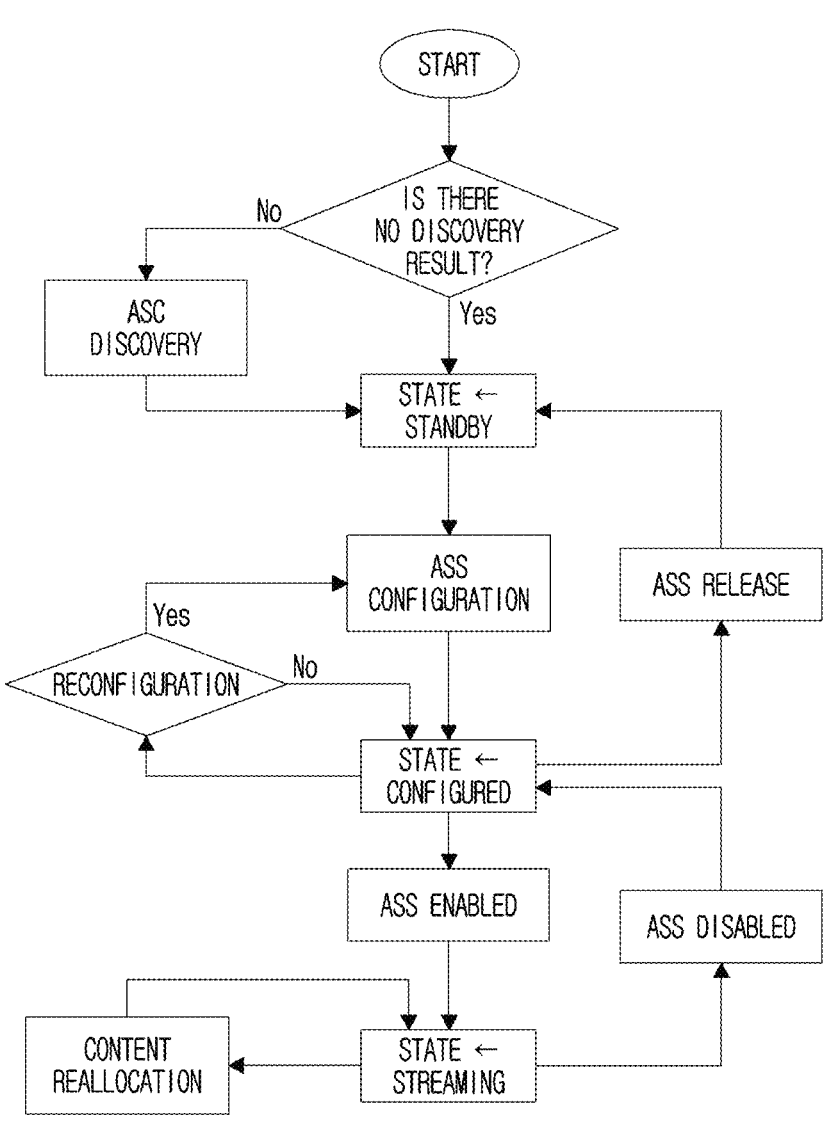
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is activated, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
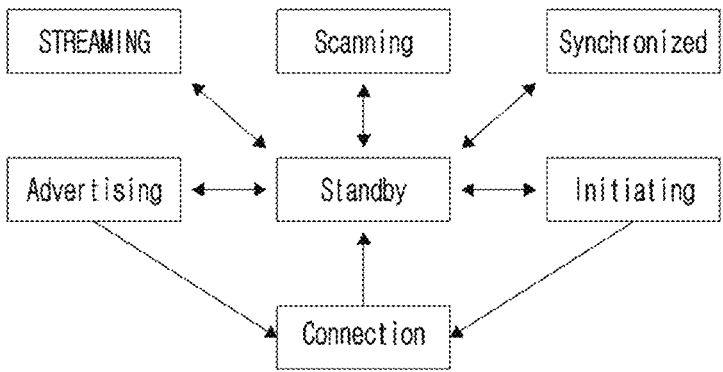
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
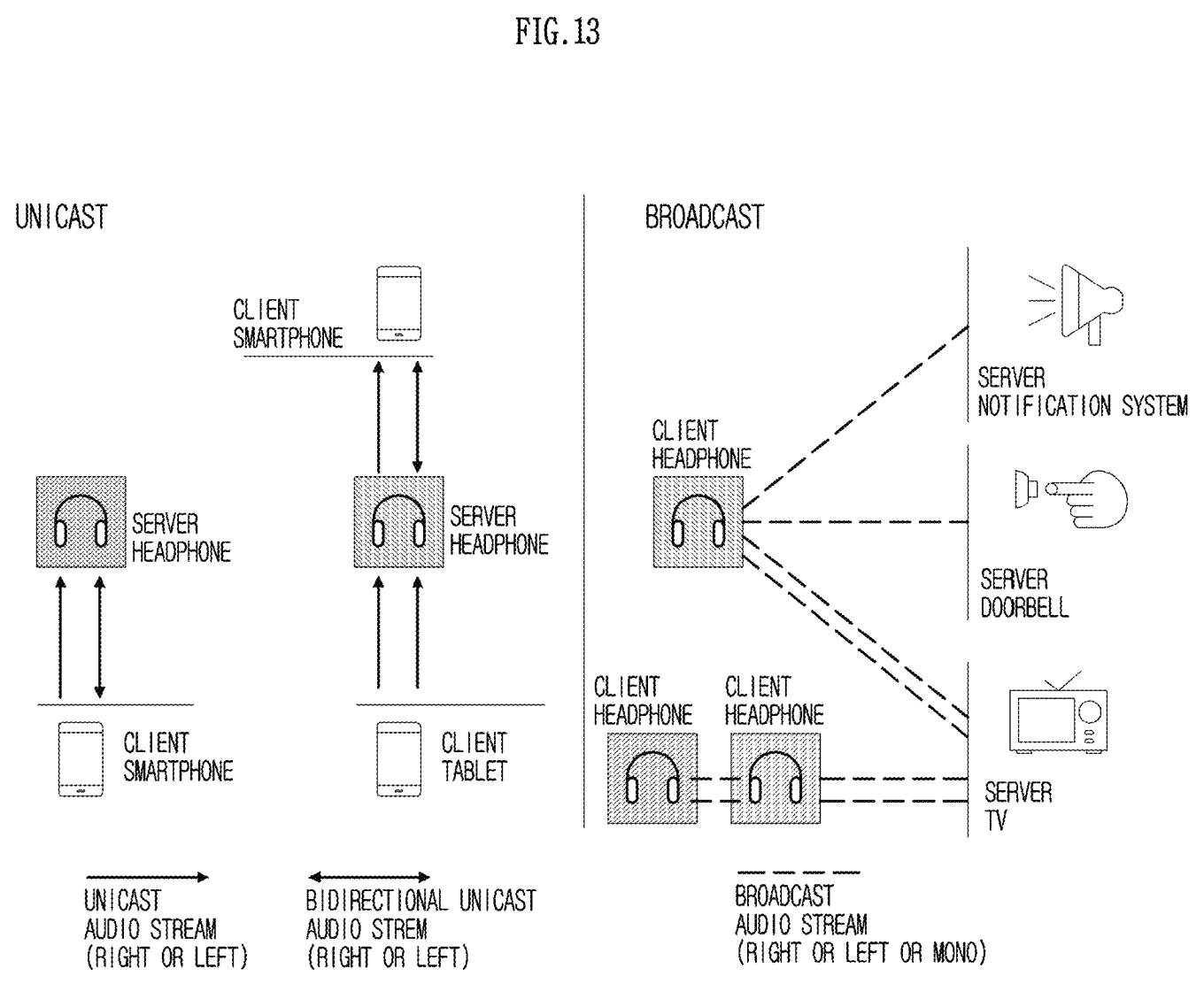

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

FIG. 14(a) to FIG. 16(b) are diagrams illustrating a message exchange procedure between a server and a client to which the present disclosure is applicable.

In the example of FIG. 14(a) to FIG. 16(b), the client may be an audio source and the server may be an audio sink. Or, the client may be an audio sink and the server may be an audio source.

FIGS. 14(a) and 14(b) exemplarily illustrates an audio session capability (ASC) discovery procedure and an ASC update procedure.

In the audio session capability discovery procedure of FIG. 14(a), the client may request capability discovery by transmitting an ASC discovery request message to the server, and in response to that, the server may transmit detailed information of the capability by transmitting an ASC discovery response message to the client.

In the audio session capability update procedure of FIG. 14(b), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIGS. 14(a) and 14(b) may be defined as shown in Table 1 below.

TABLE 1

| ASC_DISCOVERY REQUEST |
| --- |
| Direction |
| ASC_DISCOVERY RESPONSE |
| Sink Locations : Bitmap |
| Source Locations : Bitmap |
| Number of ASC Records |
| Direction |
| Codec ID |
| Sampling Frequency |
| Codec Specific |
| Content Protection Type |
| Content Protection type Specific |

The ASC update indication message and the ASC update confirmation message may include information indicating that ASC discovery is required and confirmation information therefor, respectively.

Figures 15A, 15B:
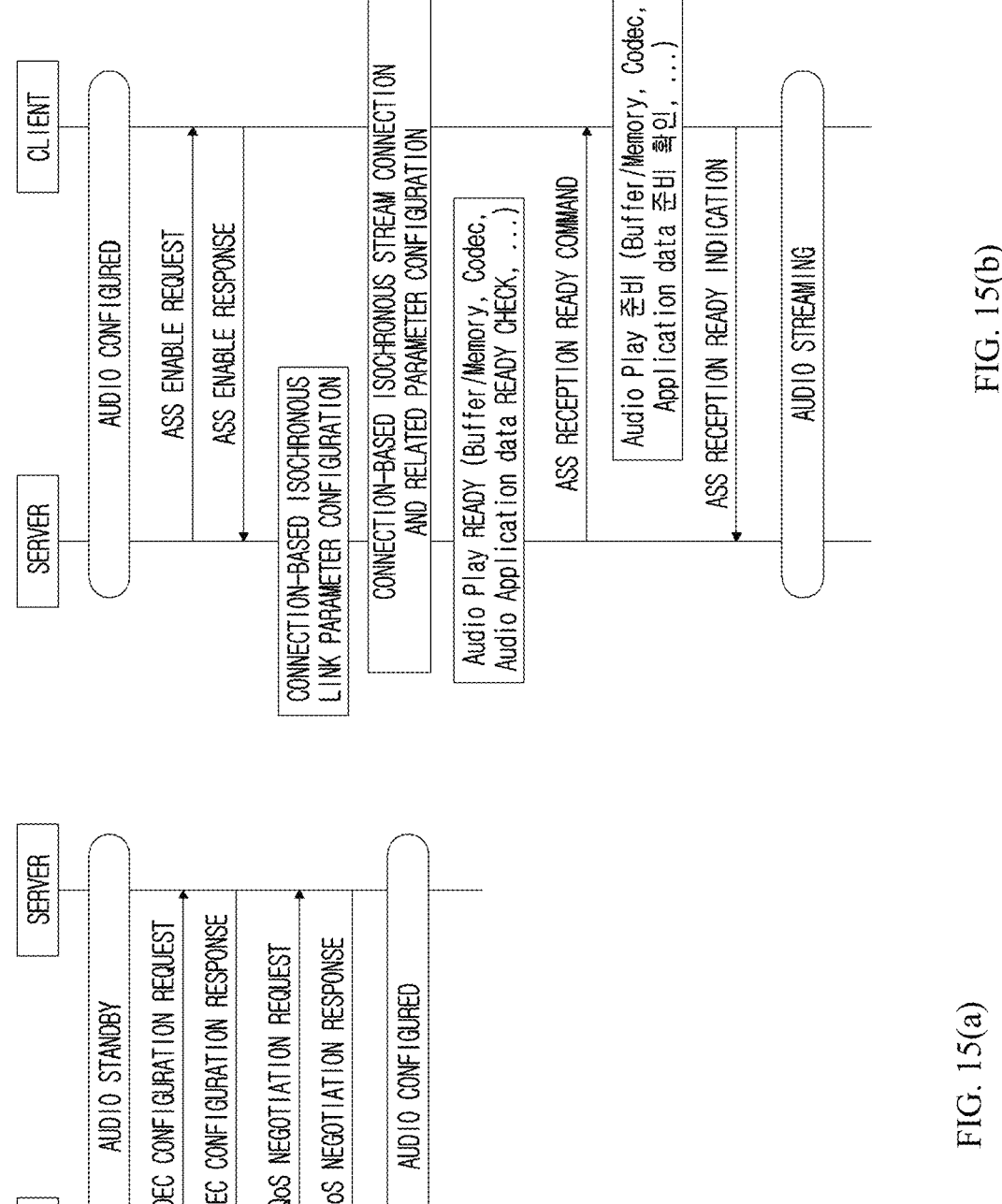

FIGS. 15(a) and 15(b) exemplarily illustrate a unicast audio stream configuration procedure and an unicast audio stream establishment procedure.

In the unicast audio stream configuration procedure of FIG. 15(a), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15(b), the client may transmit an ASS enable request message to the server in the AUDIO CONFIGURED state to inform information on the ASS requesting activation. In response, the server may transmit an ASS enable response message to the client to inform about which ASS to activate. Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIGS. 15(a) and 15(b) may be defined as shown in table 2 below.

TABLE 2

| CODEC CONFIGURATION REQUEST |
| --- |
| ASS ID |
| ASA ID |
| Direction |
| Codec ID |
| Sampling Frequency |
| Codec Specific |
| CODEC CONFIGURATION RESPONSE |
| ASS ID |
| Server Supported QoS (Interleaved, Framed, Transport Latency) |
| Presentation delay |
| QOS NEGOTIATION REQUEST |
| ASS ID |
| CBISS ID |
| CBIS ID |
| Client QoS (Transport Latency) |
| Rendering Delay |
| QOS NEGOTIATION RESPONSE |
| ASS ID |
| ASS ENABLE REQUEST/ASS ENABLE RESPONSE |
| Number of ASS ID |
| ASS ID |
| ASA ID |
| Content Type |
| ASS RX READY COMMAND/ASS RX READY NOTIFICATION |
| Number of ASS ID |
| ASS ID |

Figures 16A, 16B:
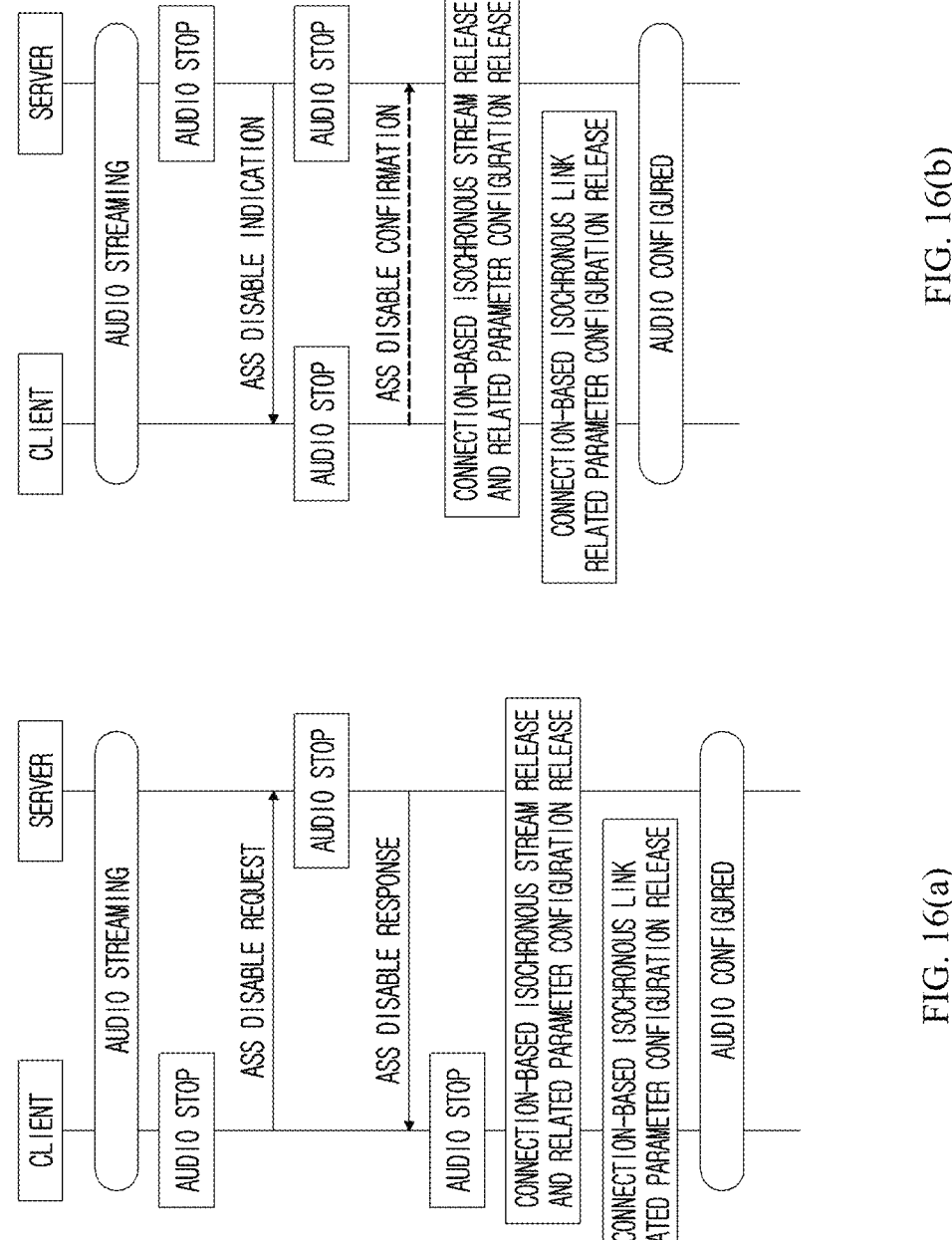

FIGS. 16(a) and 16(b) exemplarily illustrates a procedure for disabling an audio stream by a client and a procedure for disabling an audio stream by a server.

In the procedure of the client disable audio streams in FIG. 16(*a*), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(*b*), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIGS. 16(*a*) and 16(*b*) may be defined as shown in table 3 below.

TABLE 3

| ASS DISABLE REQUEST/ASS DISABLE RESPONSE/ASS DISABLE INDICATION |
| --- |
| Number oF ASS ID |
| ASS ID |
| (No Contents) |

Table 4 below exemplarily shows content reallocation request/response, ASS release request/response, general advertisement, and directed advertisement message formats.

TABLE 4

| RREASSIGN CONTENT REQUEST/REASSIGN CONTENT RESPONSE |
| --- |
| Number of ASS ID |
| ASS ID |
| ASA ID |
| Content Type |
| ASS RELEASE REQUEST/ASS RELEASE RESPONSE |

| ASS ID |
| --- |
| GENERAL ADVERTISEMENT |
| DIRECTED ADVERTISEMENT |
| Content Type |
| Meta data |

Figure 17:
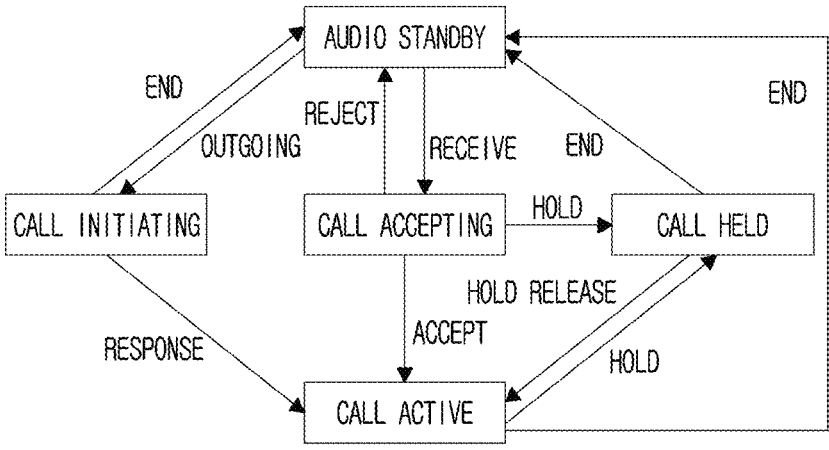
FIG. 17 is a diagram illustrating a state machine for a call service to which the present disclosure is applicable.

FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY state, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

TABLE 5

| Logical transport | Links supported | Supported by | Bearer | Overview |
|---|---|---|---|---|
| Connection based | Stream (framed or | LE isochronous physical link | LE | Unidirectional or bidirectional |

TABLE 5-continued

| Logical transport | Links supported | Supported by | Bearer | Overview |
|---|---|---|---|---|
| Isochronous Stream | unframed) LE-S or LE-F | | | transport in a point-to-point connection for transferring isochronous data. |
| Broadcast Isochronous Stream | Stream (framed or unframed) LE-S (or LE-F) and Control (LEB-C) | LE isochronous physical link | LE | Unidirectional transport for broadcasting data in a point to multipoint configuration and unidirectional transport for controlling the broadcast data |

FIGS. 18(a) to 18(d) are diagrams illustrating a packet format for each layer to which the present disclosure is applicable.

Figures 18A, 18B, 18C, 18D:
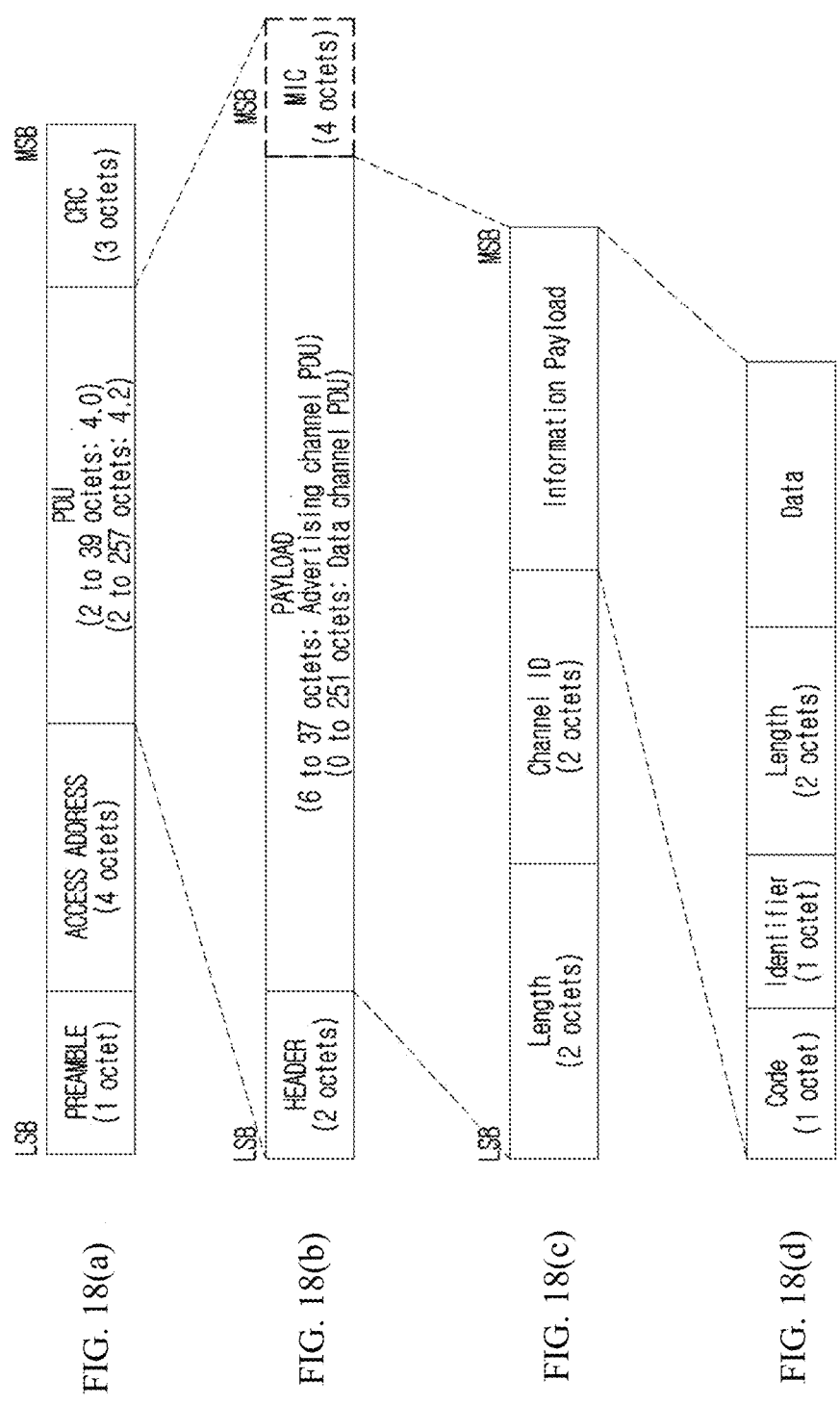
FIGS. 18(a) to 18(d) are diagrams illustrating a packet format for each layer to which the present disclosure is applicable.

FIG. 18(a) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 18(b) illustrates an exemplary format of the PDU of FIG. 18(a). PDU may be defined in two types, one is a data channel PDU (Data channel PDU), the other is an advertising channel PDU (Advertising channel PDU). The data channel PDU will be described in detail with reference to FIGS. 19(a) to 19(d), and the advertising channel PDU will be described in detail with reference to FIGS. 20(a) to 20(d).

FIG. 18(c) illustrates an example of an L2CAP PDU format, which may correspond to an exemplary format of the payload field of FIG. 18(b). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(c) is an L2CAP PDU (i.e., a control frame) transmitted on a signaling channel, the information payload field of FIG. 18(c) may be configured as shown in FIG. 18(d). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data. The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

FIGS. 19(a) to 19(d) are diagrams illustrating examples of a data unit format to which the present disclosure is applicable.

Figures 19A, 19B, 19C, 19D:
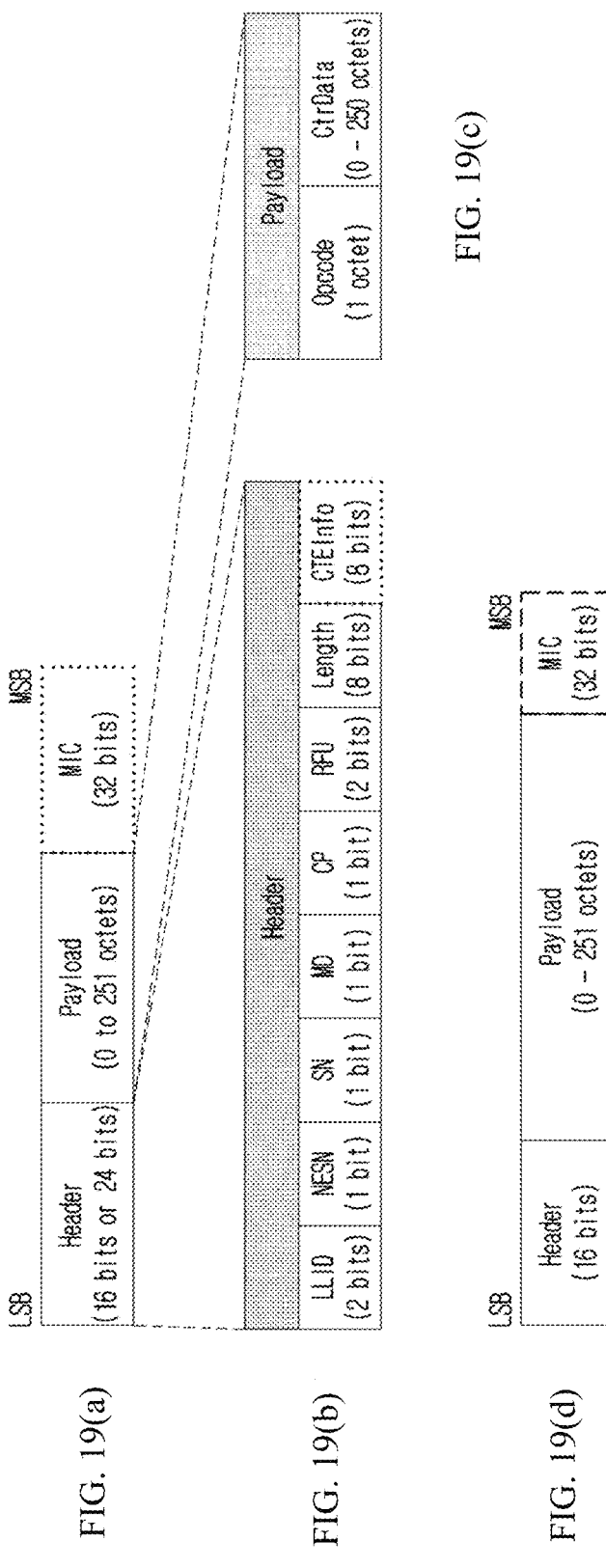
FIGS. 19(a) to 19(d) are diagrams illustrating examples of a data unit format to which the present disclosure is applicable.

FIG. 19(a) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(b), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfield. In addition, the Length field may indicate the size of the payload, and when the MIC is included, it may indicate the length of the payload and the MIC.

FIG. 19(c) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g.,0x1F, 0x20, 0x21, 0x22, . . . ) indicating one of LL_CBIS_REQ, LL_CBIS_RSP, LL_CBIS_IND, LL_CBIS_TERMINATE_IND, LL_CBIS_SDU_CONFIG_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFIG_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(d) illustrates an example of audio data PDU format.

Audio data PDU may be CBIS PUD or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PUD, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

FIGS. 20(a) to 20(d) are diagrams illustrating examples of an advertisement unit format to which the present disclosure is applicable.

Figures 20A, 20B, 20C, 20D:
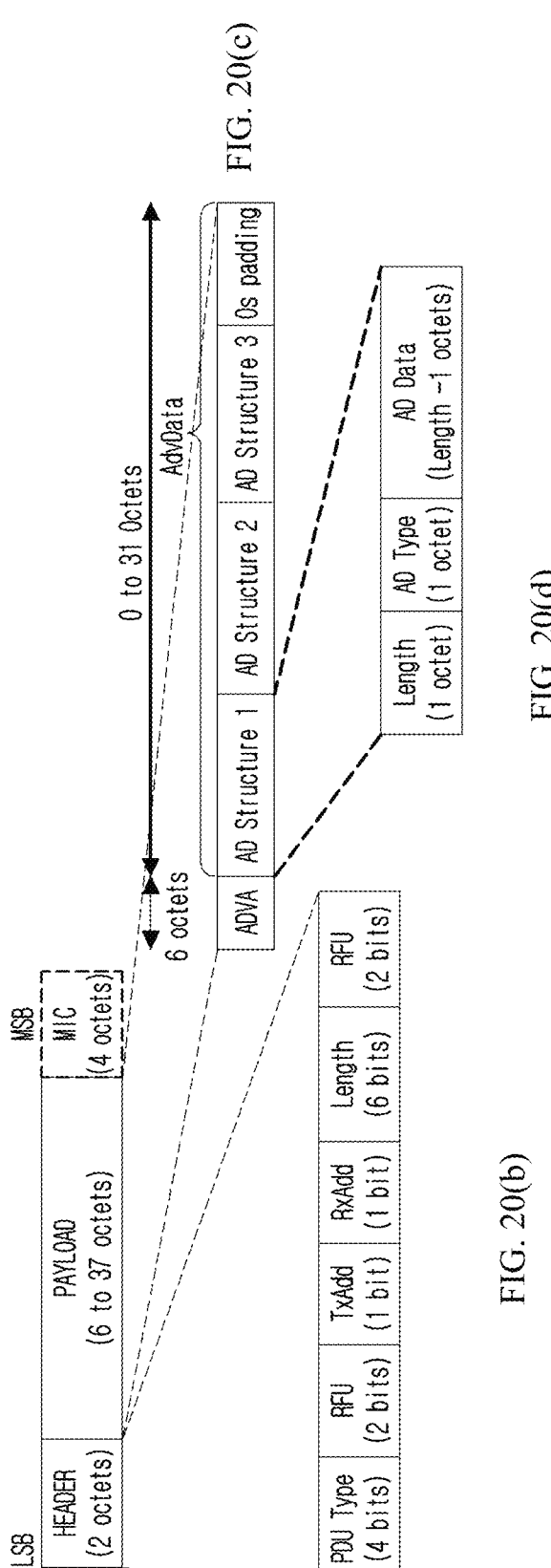
FIGS. 20(a) to 20(d) are diagrams illustrating examples of an advertisement unit format to which the present disclosure is applicable.

FIG. 20(a) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(b) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(c) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(d) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, an encryption key configuration according to the present disclosure will be described.

In the Bluetooth communication system, when the Link Manager Protocol (LMP) or dual-mode Bluetooth controller for BR/EDR encrypts the over-the-air (OTA) channel using the E0 or AES (Advanced Encryption Standard)-CCM (Cipher block Chaining-Message authentication code) block cipher method, a procedure for selecting a minimum length of an encryption key is defined. This is one of the measures to comply with regulations on the strength of encryption algorithms used in user devices. However, after this procedure was introduced in the Bluetooth communication system, these regulations were changed or updated in various regions.

A packet-injection attack may be possible during the negotiation process for the encryption key length. Due to this, the MITM (man-in-the-middle) device may intentionally reduce the key length used for a specific baseband link, thereby generating a link that can be indiscriminately decrypted in real time. Such an attack may be possible if both devices involved in establishing an encrypted link are both vulnerable at the same time.

The possibility of such an attack may be considered for the current Bluetooth communication system, for example, the GAP part (e.g., BR/EDR security mode 4) includes the step of checking the encryption key size of the link after encryption is established to confirm that a key size sufficient for a specific purpose is selected. Also, some Bluetooth profiles use this method to require a certain minimum key length.

There are implementations that are vulnerable to security by allowing negotiation of key length, and the negotiated key length is not always checked, and in some implementations the minimum allowed length may be readily and indiscriminately decrypted if a reduced key length can be negotiated.

The Bluetooth communication system is updated to force a GAP-level key-length check, and to recommend or enforce a new encryption key length in the Bluetooth host implementation, and improvements are being made to support the recommended minimum encryption key length in the Bluetooth controller hardware as well. Qualification tests are also required to verify that implementations conform to these requirements.

Until changes to the Bluetooth standard are adopted, implementations must follow existing standards where the encryption key size is not sufficient. Therefore, it is recommended that a key encryption key of 7 octets or more is enforced by the host for each encrypted link being established. Hosts using Host Controller Interface (HCI) and controllers that support the HCI command 'Read Encryption Key Size' may be encouraged to use this command to determine the length of the selected encryption key for an encrypted link after an event indicating successful encryption establishment has been received. An update is needed to require controllers that support the HCI interface to support these HCI commands. In a structure in which a controller that does not support HCI or a host and a controller are integrated, the GAP layer or higher layers may perform equivalent operations.

If allowed by the requirements for backwards-compatibility, a Bluetooth device may operate in a secure-connection-only mode and use a Random Number Generator (RNG), hash, and block-encryption algorithm compliant with Federal Information Processing Standards (FIPS). Additionally, improvements are needed to ensure that the minimum key length for cryptographic concatenated mode complies with the 16 octet cryptographic key length requirement.

As described above, since the security vulnerability due to the short encryption key length is a problem in the existing Bluetooth communication system, correction of the encryption key length is required. Hereinafter, embodiments of encryption key setting, in particular, setting of encryption key size (or length) according to the present disclosure will be described.

As described with reference to FIGS. 2(a) to 2(c), the Bluetooth device may include a host layer and a controller layer, and the interface layer between the host and controller layer is called a Host Controller Interface (HCI).

HCI provides a uniform way for the host to access the capabilities of the controller. Communication through the HCI interface takes the form of a packet. The host may transmit an HCI command packet to the controller and asynchronously receive notification from the controller using an HCI event. A packet transmitted/received on the HCI interface may have one of four types. The four types are defined as HCI command packet, HCI asynchronous data packet, HCI synchronous data packet, and HCI event packet.

FIGS. 21(a) and 21(b) show an exemplary HCI packet format to which the present disclosure is applicable.

FIG. 21(a) shows an example of an HCI command packet format, and FIG. 21(b) shows an example of an HCI event packet format.

The HCI command packet as in the example of FIG. 21(a) is used by the host to send a command to the controller.

Each command is assigned a unique OpCode with a size of 2 bytes (or octets), and the OpCode is divided into two fields OGF (OpCode Group Field) and OCF (OpCode Command Field). OGF is used to group similar OpCodes, and OCF is used to identify a specific instruction within an OpCode group.

The 1-byte parameter total length field specifies the total length of all parameters included in the remaining part of the HCI command packet in units of octets. Following the parameter full length field, one or more command parameters may be included.

The HCI event packet as in the example of FIG. 21(b) is used by the controller to notify the host when an event will occur. The HCI event may be generated as a response to an HCI command previously transmitted from the host, or due to another event (e.g., error occurrence, disconnection, connection request reception, etc.).

The HCI event packet includes an event code field with a size of 1 byte. The event code may include a value identifying an event that has occurred.

The 1-byte parameter total length field specifies the total length of all parameters included in the remaining portion of the HCI event packet in units of octets. Following the parameter full length field, one or more event parameters may be included.

Although not shown in FIGS. 21(a) and 21(b), HCI asynchronous data packets may be used to exchange data between a host and a controller, and may be exchanged after a connection is established. HCI synchronous data packets are used to exchange synchronous data between the host and the controller.

Table 6 below shows an example of an HCI command or event for connection encryption.

TABLE 6

| Set Connection Encryption Command | | | |
|---|---|---|---|
| Command | OCF | Command parameter | Return parameter |
| HCI_Set_Connection_Encryption | 0x0013 | Connection_Handle, Encryption_Enable | |

| Value | Parameter description |
|---|---|
| Connection_Handle: Size: 2 Octets (meaningful 12 bits) | |
| 0xXXXX | Connection_Handle Range: 0x0000 to 0x0EFF |
| Encryption_Enable: Size: 1 Octet | |
| 0x00 | Link level encryption OFF |
| 0x01 | Link level encryption ON |

The Set_Connection_Encryption (or HCI_Set_Connection_Encryption) command may be used to enable and disable link level encryption.

The Connection_Handle command parameter may be used to identify another controller that is establishing a connection. Connection_Handle may be Connection_Handle for asynchronous connection. Encryption configuration may be applied to all Connection_Handle parameters having the same remote controller. While the encryption is changing, the Link Manager may stop all asynchronous traffic on the connection.

When both devices support both secure connection (controller support) and secure connection (host support) features, and encryption is currently enabled on a specific Connection_Handle, if the Encryption_Enable parameter is configured to a value indicating link level encryption OFF (Turn Link Level Encryption OFF), the controller may return an error code (e.g., 0x25) indicating Encryption Mode Not Acceptable.

When the controller receives the HCI_Set_Connection_Encryption command, the controller may transmit an HCI_Command_Status event to the host. When the link manager completes encryption enable/disable for the connection, the local controller may send an HCI_Encryption_Change event to the host, and the controller on the remote device may also generate an HCI_Encryption_Change event.

When various HCI commands such as the above-described example of HCI_Set_Connection_Encryption are designed, they may be implemented in software like the hci_map structure. Table 7 shows an example of the source code including the hci_map structure (e.g., BlueZ, which is an open source of the Bluetooth stack).

TABLE 7

```
typedef struct {
        char *str;
unsigned int val;
} hci_map;
...
/* Command mapping */
static hci_map commands_map[ ] = {
        { "Inquiry",                          0 },
        { "Inquiry Cancel",                    1 },
        { "Periodic Inquiry Mode",             2 },
        { "Exit Periodic Inquiry Mode",   3 },
        { "Create Connection",            4 },
```

TABLE 7-continued

```
        { "Disconnect",                        5 },
        { "Add SCO Connection",                      6 },
        { "Cancel Create Connection",          7 },
        { "Accept Connection Request",         8 },
        { "Reject Connection Request",         9 },
        { "Link Key Request Reply",           10 },
        { "Link Key Request Negative Reply",  11 },
        { "PIN Code Request Reply",           12 },
        { "PIN Code Request Negative Reply",  13 },
        { "Change Connection Packet Type",    14 },
        { "Authentication Requested",         15 },
        { "Set Connection Encryption",        16 },
        { "Change Connection Link Key",             17 },
        { "Master Link Key",                  18 },
        { "Remote Name Request",                    19 },
        { "Cancel Remote Name Request",             20 },
        { "Read Remote Supported Features",   21 },
        { "Read Remote Extended Features",    22 },
        { "Read Remote Version Information",  23 },
...                                                160 },
        { "Reserved",
        { "Reserved",                              161 },
        { "Send Keypress Notification",       162 },
        { "IO Capability Request Negative Reply", 163 },
        { "Read Encryption Key Size",         164 },
        { "Reserved",                              165 },
        { "Reserved",                              166 },
        { "Reserved",                              167 },
...
```

A newly designed instruction may be added to the hci_map structure as in the example of Table 7. For example, as shown in Table 8. commands such as read_encrypt_key_size_cmd and read_encrypt_key_size_rsp may be additionally designed, and may be called and used through set_bredr_command.

TABLE 8

```
static void read_encrypt_key_size_cmd(const void *data, uint8_t size)
{
        const struct bt_hci_cmd_read_encrypt_key_size *cmd = data;
        print_handle(cmd->handle);
}
static void read_encrypt_key_size_rsp(const void *data, uint8_t size)
{
        const struct bt_hci_rsp_read_encrypt_key_size *rsp = data;
        print_status(rsp->status);
        print_handle(rsp->handle);
```

TABLE 8-continued

```
        print_key_size(rsp->key_size);
}
...
static void set_bredr_commands(struct btdev *btdev)
{
        set_common_commands_all(btdev);
        set_common_commands_bredrle(btdev);
        set_common_commands_bredr20(btdev);
...
        btdev->commands[16] |= 0x08; /* Setup Synchronous Connection
*/
        btdev->commands[17] |= 0x01; /* Read Extended Inquiry
Response */
        btdev->commands[17] |= 0x02; /* Write Extended Inquiry
Response */
        btdev->commands[17] |= 0x20; /* Read Simple Pairing Mode */
        btdev->commands[17] |= 0x40; /* Write Simple Pairing Mode */
        btdev->commands[17] |= 0x80; /* Read Local OOB Data */
        btdev->commands[18] |= 0x01; /* Read Inquiry Response TX
Power */
        btdev->commands[18] |= 0x02; /* Write Inquiry Response TX
Power */
        btdev->commands[18] |= 0x80; /* IO Capability Request Reply */
        btdev->commands[20] |= 0x10; /* Read Encryption Key Size */
        btdev->commands[23] |= 0x04; /* Read Data Block Size */
        btdev->commands[29] |= 0x20; /* Read Local Supported Codecs */
        btdev->commands[23] |= 0x08; /* Get MWS Transport Layer Con-
fig */
} ? end set_bredr_command ?
...
```

Referring back to FIGS. 2(*a*) and 2(*b*), a protocol stack to which the present disclosure is applicable will be described.

FIG. 2(*a*) shows a BR/EDR protocol stack, FIG. 2(*b*) shows a BLE protocol stack.

The host is generally implemented in software, and the controller is generally implemented in hardware, but the scope of the present disclosure is not limited thereto. Each host or controller may be configured in the form of software, hardware, a combination of software and hardware, or firmware.

In the case of BR/EDR, a security-related entity may be included in the controller. Meanwhile, in the case of the LE, the function of the security manager SM may be included in the controller or the host. In the examples of the present disclosure, encryption and security-related functions are not limited to being included only in either the controller or the host.

An entity that issues HCI commands to the controller and a host/profile/service may all be included in the host. A part corresponding to the profile/service may be included in a higher layer.

For example, the command may be passed in the following order: Profile, Secure Entity (e.g., SM for LE), HCI, Controller (e.g., LL for LE).

Figure 22:
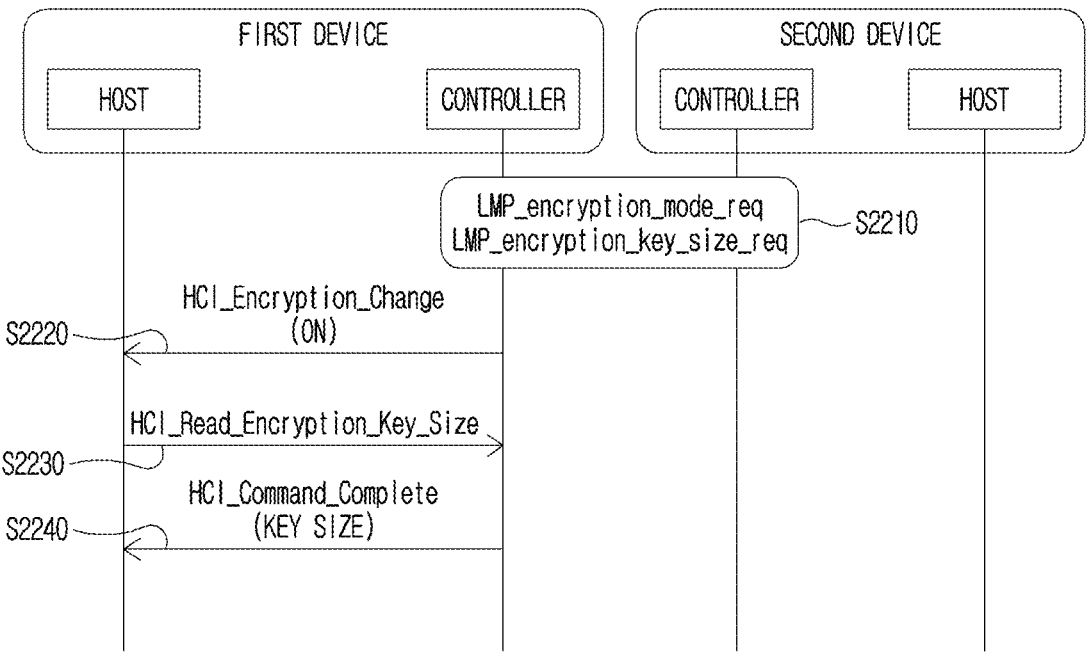
FIG. 22 is a diagram illustrating an example of an encryption configuration method to which the present disclosure is applicable.

FIG. 22 is a diagram illustrating an example of an encryption configuration method to which the present disclosure is applicable.

Referring to FIG. 22, a first device includes a controller and a host, and a second device also includes a controller and a host.

In step S2210, LMP_encryption_mode_req and LMP_encryption_key_size_req messages (or PDUs) may be exchanged between the controllers of the first and second devices.

The LMP_encryption_mode_req message may be used to start or end an encryption mode (or security mode). The LMP_encryption_mode_req message may be transmitted from a device (e.g., first device) that starts/ends encryption mode setting through an HCI_Set_Connection_Encryption command to a counterpart device (e.g., second device). The device receiving the LMP_encryption_mode_req message may respond using the LMP_accepted message (not shown).

The LMP_encryption_key_size_req message may include information on the size of the encryption key suggested by the master device. The LMP_encryption_key_size_req message may be transmitted from the master device to the slave device. The device receiving the LMP_encryption_key_size_req message may respond using the LMP_accepted message (not shown).

In addition, although not shown in FIG. 22, after the LMP_encryption_key_size_req message and its response are exchanged, the LMP_start_encrption_req message and its response (e.g., LMP_accepted message) may be exchanged to prepare encryption application according to the configured encryption mode and key size.

In step S2220, the controller of the first device may transmit an HCI_Encryption_Change event to the host. The HCI_Encryption_Change event may include information (e.g. Encryption_Enable parameter) indicating (e.g. transmitted with information indicating ON) that the change in encryption for the Connection_Handle specified by the Connection_Handle event parameter has been completed.

Upon receiving the HCI_Encryption_Change event from the controller, the host of the first device may transmit an HCI_Read_Encryption_Key_Size command to the controller in operation S2230. The HCI_Read_Encryption_Key_Size command may be used to read the encryption key size for a given Connection_Handle.

Upon receiving the HCI_Read_Encryption_Key_Size command from the host, the controller of the first device may transmit an HCI_Command_Complete event including information on the key size to the host in step S2240. The HCI_Command_Complete event may be used to transmit a return status for each HCI command or to transmit other event parameters. For example, the HCI_Command_Complete event may be configured similarly to the HCI_Encryption_Change event, and may include, for example, Connection_Handle, Encryption Enable, and key size information.

In this example, the controller may configure link security using an encryption key having a length implemented as a default value. However, as described above, there is a problem in that the default key length is short, which is weak in security.

In addition, the command for the host to configure the minimum length for the encryption key to the controller is not defined, and the changed key size in the controller must be obtained by the host using a read command.

Figure 23:
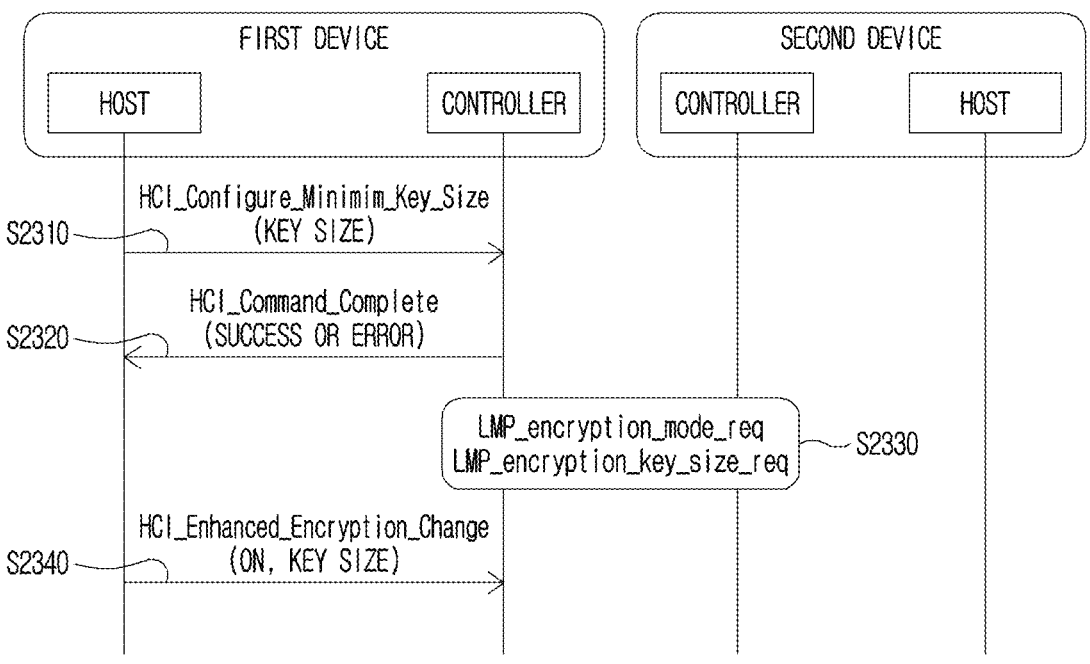
FIG. 23 is a diagram illustrating an additional example of an encryption configuration method to which the present disclosure is applicable.

FIG. 23 is a diagram illustrating an additional example of an encryption setting method to which the present disclosure is applicable.

In operation S2310, the host of the first device may transmit an HCI_Configure_Minimum_Key_Size command to the controller. The HCI_Configure_Minimum_Key_Size command is defined as a command for the host to set the minimum length for the encryption key to the controller.

In response to the HCI_Configure_Minimum_Key_Size command, the controller may transmit an HCI_Command_Complete event to the host in step S2320.

The controller may transmit information indicating success or error to the host by using the HCI_Command_Complete event. For example, the controller may have a range or candidate values for a supportable key size, and a specific one key size among the supportable key sizes may be set as the default key size. For example, success may be indicated when the default key size configured by the controller is equal to or greater than the minimum key size configured by the host, and the minimum key size configured by the host corresponds to a key size supportable by the controller. An error may be indicated when the default key size configured by the controller is less than the minimum key size configured by the host or the minimum key size configured by the host does not correspond to the key size supported by the controller.

If the controller supports a key size greater than the minimum key size configured by the host, similar to that described in FIG. 22, In operation S2330, LMP_encryption_mode_req and LMP_encryption_key_size_req messages are exchanged between the controllers of the first and second devices, so that an encryption mode and an encryption key size may be configured or changed.

Unlike the example of FIG. 22, in the example of FIG. 23, a command for the host to read a key size from the controller and a response thereto may be omitted. Instead, through the HCI_Encryption_Change event in step S2340, information (ON) indicating that the change in encryption for a specific Connection_Handle has been completed and information on the key size may be provided from the controller to the host. That is, the HCI_Encryption_Change event may further include information indicating a key size set/changed in the controller.

In this example, only error information is transmitted to the host when the key size configured as a default value in the controller is smaller than the minimum key size configured by the host. In this case, since the host does not know which key size the controller supports, there is a problem in that it cannot clearly determine what value to configure to prevent an error even if the minimum key size is configured again.

Also, even if the host defines and uses a command (e.g. HCI_Configure_Minimum_Key_Size command) to configure the minimum key size to the controller, when a plurality of links/connections/services/profiles exist in one device, there is a problem in that it is not clear whether the minimum key size is configured in common or individually for each link/connection/service/profile.

Figure 24:
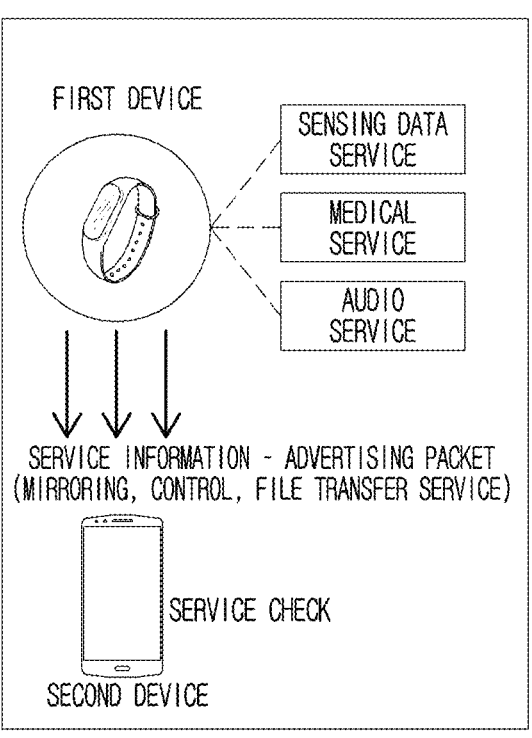
FIG. 24 exemplarily shows a device related to an encryption configuration to which the present disclosure is applicable.

FIG. 24 exemplarily shows a device related to an encryption configuration to which the present disclosure is applicable.

It is assumed that the example first device can support various applications or services. For example, the first device may support a sensing data service, a medical service, an audio service, and the like. Service information of the first device may be delivered to the second device through an advertising packet (e.g., mirroring, control, file transfer service, etc.). The second device may check service related information delivered from the first device.

Figure 25:
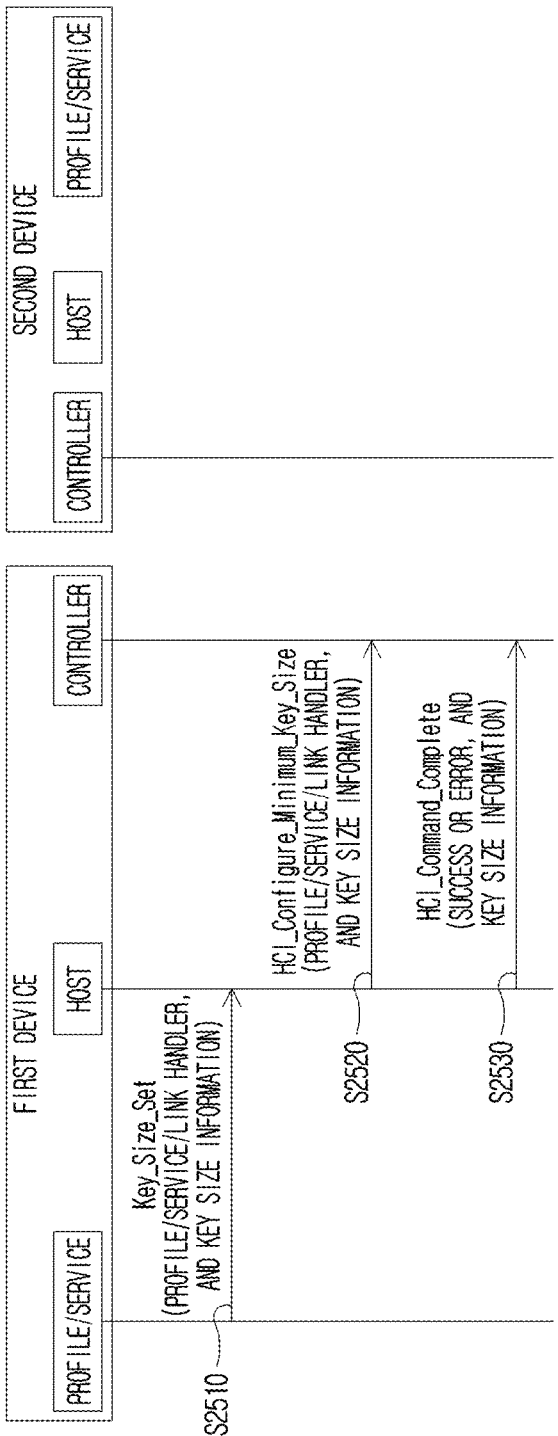
FIG. 25 is a diagram illustrating an example of configuring an encryption key size to which the present disclosure is applicable.

FIG. 25 is a diagram illustrating an example of an encryption key size configuration to which the present disclosure is applicable.

As described in the above examples, when the minimum value of the key size configured by the host is smaller than the default configuration value of the controller (that is, the key size value configured as the default in the controller), the controller may transmit error information to the host.

However, there is ambiguity in the error response operation of the host receiving the error information from the controller. Specifically, in the case of FIG. 24, the controller only transmits error information to the host, and information on how small the minimum key size configured by the host is compared to the default key size in the controller is not provided to the host. Accordingly, since the host repeatedly attempts to configure the minimum key size in a blind method, unnecessary time and resources are consumed. Accordingly, such ambiguity may be eliminated by the controller notifying the host of information on the key size supportable by the controller along with error information as in the following examples.

In the following examples according to the present disclosure, the information about the encryption key size (i.e., key size information) may include one or more of the key size or length itself, the minimum value, maximum value, range, or one or more candidate values for the key size or length.

As a representative example, while it is described that the host may generate and/or provide a minimum value for the key size to the controller via a first message (or command), but the scope of the present disclosure is not limited thereto, and one or more of a key size itself, a maximum value, a range, or one or more candidate values therefor may be generated and/or provided to the controller.

Although the controller is described as being capable of generating and/or providing information to the host via a second message (or event) indicative of the key size itself that the controller is supportable or default to the controller, but the scope of the present disclosure is not limited thereto, and one or more of a minimum, maximum, range, or one or more candidate values for the key size may be generated and/or provided to the host.

Although the profile/service is described as being able to generate and/or provide a minimum value for the key size to the host via a third message, but the scope of the present disclosure is not limited thereto, and one or more of a key size itself, a maximum value, a range, or one or more candidate values therefor may be generated and/or provided to the host.

In various examples of the present disclosure, key size information may be configured for a predetermined unit. A predetermined unit may be defined by one or a combination of two or more of a profile, service, link, connection, or device (or host).

As a more specific example, the controller may provide the host with information on a key size supported by the controller. The controller may provide the host with information about the key size set as a default in the controller. The controller may include, in a message in response to the command to configure the encryption key minimum value by the command from the host, information on a supportable (or default configured in the controller) key size.

If the configuration for the minimum key size by the command from the host is successful, the controller may provide the host with information about key sizes supported by the controller (or configured by default in the controller) in a response (or response event). If the minimum value of the key size configured by the command from the host is greater than or equal to the default configuration value of the controller (that is, the key size value supported by the controller or configured by default in the controller), the controller may provide the host with information about the key sizes supported by the controller (or configured by default in the controller).

If the configuration for the minimum key size by the command from the host is an error, the controller may provide the host with information about key sizes supported by the controller (or configured by default in the controller) in a response (or response event). When the minimum value of the key size configured by the command from the host is smaller than the default setting value of the controller (that is, the key size value supported by the controller or configured by default in the controller), the controller may provide the host with information about the key sizes supported by the controller (or configured by default in the controller).

Accordingly, when the host configures the minimum encryption key size for the controller, based on the information about the key size supported by the controller (or set by default in the controller) further included in the response message including the error information from the controller, the minimum encryption key size configuration may be performed again by adjusting/changing the minimum encryption key size to be configured for the controller.

As a further example, when the configuration for the minimum key size by a command from the host is an error, the controller may transmit a first event including error information to the host, and additionally transmit a second event including information on a key size supportable by the controller (or configured as a default in the controller) to the host. When the minimum value of the key size configured by the command from the host is smaller than the default configuration value of the controller (that is, the key size value supported by the controller or configured by default in the controller), the controller may transmit a first event including error information to the host, and additionally transmit a second event including information on a key size supportable by the controller (or configured as a default in the controller) to the host.

The command used by the host to configure the minimum value for the encryption key size to the controller may further include information on a unit to which the minimum value for the encryption key size is applied. For example, the unit to which the minimum value for the encryption key size configured by the host is applied may be composed of one or a combination of two or more of a link, a connection, a profile, a service, or a device (or a host).

For example, a separate key size minimum may be configured for each link. A single key size minimum value common to a plurality of links may be configured. An individual minimum key size value may be configured for some link(s) among all links configured in the device (or host), and a common minimum key size value may be configured for the remaining link(s). One key size minimum value common to all links configured in the device (or host) may be configured.

For example, a separate key size minimum may be configured for each profile. A single minimum key size value common to a plurality of profiles may be configured. An individual minimum key size value may be configured for some profile(s) among all profiles configured in the device (or host), and a common minimum key size value may be configured for the remaining profile(s). A single minimum key size value common to all profiles configured in the device (or host) may be configured.

For example, an individual minimum key size may be configured for each service. A single minimum key size value common to a plurality of services may be configured. An individual minimum key size value may be configured for some service(s) among all services set in the device (or host), and a common minimum key size value may be configured for the remaining service(s). One key size minimum value common to all services configured in the device (or host) may be configured.

For example, the minimum value of an individual or common key size in units of link/connection and profile combination, link/connection and service combination, profile and service combination, or link, connection profile and service combination, configured on the device (or host), may be configured In step S2510, the specific profile/service of the first device may transmit a key size setting (Key_Size_Set) message to the host. The Key_Size_Set message may include a profile identifier, a service identifier, a link/connection identifier (or a link/connection handler), key size information, and the like. This means that the Key_Size_Set message specifies a unit of one or more combinations of link/connection, profile, or service, and includes information on the minimum value of the encryption key size applied to the specified unit.

In step S2520, the host may transmit an HCI_Configure_Minimum_Key_Size command to the controller based on the information on the minimum encryption key size provided from the profile/service. The HCI_Configure_Minimum_Key_Size command may include a profile identifier, a service identifier, a link/connection identifier (or a link/connection handler), key size information, and the like. This means that the HCI_Configure_Minimum_Key_Size command specifies a unit of one or more combinations of link, connection, profile, or service, and includes information on the minimum value of the encryption key size applied to the specified unit.

In step S2530, the controller may compare the minimum value for the encryption key size configured by the command of the host with the encryption key size supportable by the controller (or configured as a default in the controller).

As a result of comparison, if the minimum value for the encryption key size configured by the host command is smaller than the encryption key size supportable by the controller (or configured by default in the controller), a response event (e.g. HCI_Command_Complete) including error information may be transmitted to the host. In addition, information on an encryption key size supportable by the controller (or configured as a default in the controller) may be further included in the response event including the error information and transmitted to the host. Alternatively, after transmitting the first response event including error information to the host, the controller may transmit a second response event including information on the size of an encryption key supportable (or configured as a default in the controller) to the host.

As a result of comparison, if the minimum value for the encryption key size set by the host command is equal to or greater than the encryption key size supportable by the controller (or set as a default in the controller), a response event (e.g., HCI_Command_Complete) including success information may be transmitted to the host. In addition, information on an encryption key size supportable by the controller (or configured as a default in the controller) may be further included in the response event including the success information and transmitted to the host. Alternatively, after transmitting a first response event including success information to the host, the controller may transmit a second response event including information on an encryption key size supportable (or configured as a default in the controller) to the host.

Figure 26:
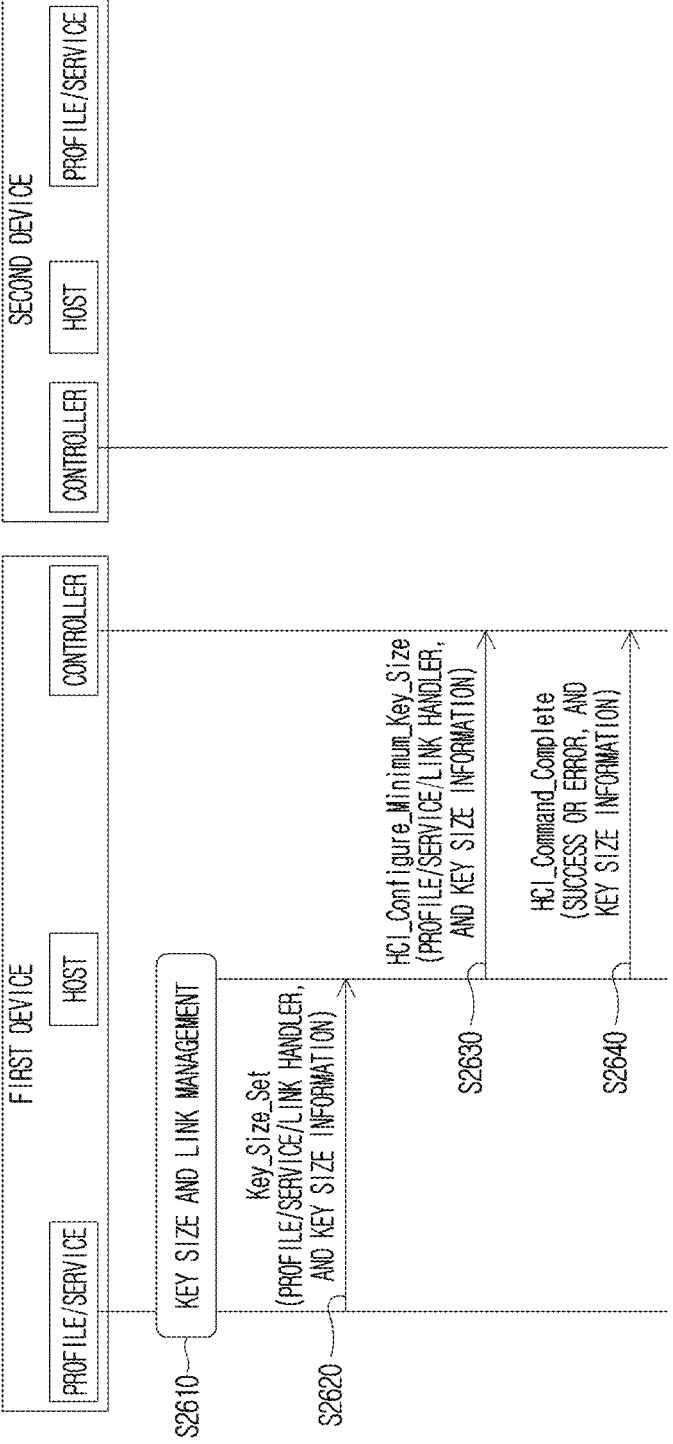
FIG. 26 is a diagram illustrating an additional example of configuring an encryption key size to which the present disclosure is applicable.

FIG. 26 is a diagram illustrating an additional example of an encryption key size configuration to which the present disclosure is applicable.

For the sake of brevity, in the example of FIG. 26, descriptions of portions overlapping those of FIG. 25 will be omitted.

In the example of FIG. 26, in step S2610, an operation of managing a key size and a link may be performed between the profile/service of the first device and the host based on the profile/service characteristics or characteristics.

For example, between the profile/service and the host, information on the key size for each profile/service may be configured. Table 9 shows an example of a key size table indicating a mapping relationship between a key size and a link/connection identifier (or a link/connection handler) for each profile/service.

TABLE 9

| Profile/Service | (Minimum Key Size(in octet(s)) | (Link ID/handle) |
|---|---|---|
| Sensing data | 5 | ACL #1 |
| Medical | 16 | ACL #2 |
| Audio | 8 | ISO #31 |
| Audio | 8 | SCO #34 |

In the example of Table 9, for the sensing data profile/service, the minimum value of the key size is configured to 5 octets, and the corresponding link/connection may be ACL #1. For a medical profile/service, the minimum value of the key size is configured to 16 octets, and the corresponding link/connection may be ACL #2. For an audio profile/service, the minimum value of the key size is configured to 8 octets, and the corresponding link/connection may be ISO #31 and SCO #34.

When the minimum value of the encryption key size for a specific profile/service/link/connection is determined between the profile/service and the host, a Key_Size_Set message including this information may be delivered from the profile/service to the host. The Key_Size_Set message may include a profile identifier, a service identifier, a link/connection identifier (or a link/connection handler), key size information, and the like. This means that the Key_Size_Set message specifies a unit of one or more combinations of link, connection, profile, or service, and includes information on the minimum value of the encryption key size applied to the specified unit.

When the minimum value of encryption key size for a specific profile/service/link/connection is set by a command from the host, the controller may compare the minimum key size indicated for the corresponding profile/service/link/connection with a key size supportable by the controller (or set as a default in the controller), and transmit a response event (e.g., events containing success/error and/or key size information) according to the comparison result to the host.

Figure 27A:
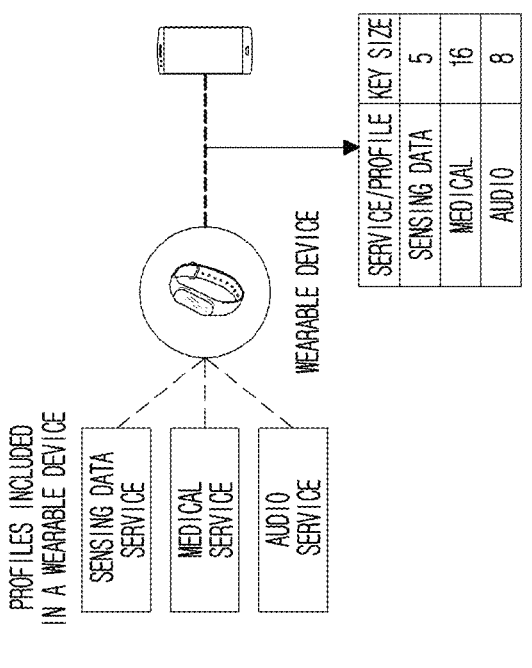
FIGS. 27(a) and 27 (b) show an example of configuring a minimum encryption key size for each service/profile to which the present disclosure is applicable.
Figure 27B:
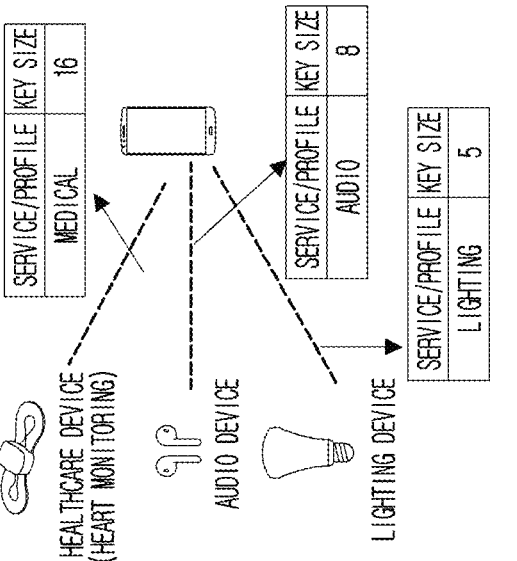

FIGS. 27(a) and 27(b) show an example of a minimum encryption key size configuration for each service/profile to which the present disclosure is applicable.

FIG. 27(a) illustrates a case in which a plurality of devices having different services/profiles are connected.

For example, the host and controller of a healthcare device (including heart monitoring function) may configure the encryption key size minimum to be 16 octets for the healthcare service/profile (e.g., using the HCI_Configure_Minimum_Key_Size command and HCI_Command_Complete event between the host and the controller of the first device as in the example of FIG. 25 or FIG. 26). Accordingly, in order to exchange medical data between the healthcare device and the remote device (e.g., a smartphone), a secure connection may be established using an encryption key with a length of 16 octets or more (e.g., using the LMP_encryption_mode_req and LMP_encryption_key_size_req between the controller of the first device and the controller of the second device as in the example of FIG. 22 or 23 and the LMP_accepted message in response thereto).

The host and controller of the audio device may configure the encryption key size minimum to be 8 octets for the medical service/profile (e.g., using the HCI_Configure_Minimum_Key_Size command and HCI_Command_Complete event between the host and the controller of the first device as in the example of FIG. 25 or FIG. 26). Accordingly, in order to send and receive audio data between the audio device and the remote device (e.g., a smartphone), a secure connection using an encryption key having a length of 8 octets or more may be established (e.g., using the LMP_encryption_mode_req and LMP_encryption_key_size_req between the controller of the first device and the controller of the second device as in the example of FIG. 22 or 23 and the LMP_accepted message in response thereto).

The host and controller of the lighting device may configure the minimum encryption key size for the lighting service/profile to be 5 octets (e.g., using the HCI_Configure_Minimum_Key_Size command and HCI_Command_Complete event between the host and the controller of the first device as in the example of FIG. 25 or FIG. 26). Accordingly, in order to send and receive audio data between the lighting device and the remote device (e.g., a smartphone), a secure connection using an encryption key having a length of 5 octets or more may be established (e.g., using LMP_encryption_mode_req and LMP_encryption_key_size_req and a response LMP_accepted message between the controller of the first device and the controller of the second device as in the example of FIG. 22 or 23).

FIG. 27(b) shows a case in which a single device having a plurality of services/profiles is connected.

The wearable device may include a plurality of services/profiles. For example, the plurality of services/profiles may include a sensing data service, a medical service, and an audio service.

The host and the controller of the wearable device may configure the minimum encryption key size of 5, 16, and 8 octets for a plurality of sensing data, medical, and audio services/profiles, respectively (e.g., using the HCI_Configure_Minimum_Key_Size command and HCI_Command_Complete event between the host and the controller of the first device as in the example of FIG. 25 or FIG. 26). Accordingly, in order to exchange sensing, medical, and audio data between the wearable device and the remote device (e.g., a smartphone), a secure connection using an encryption key having a length of 5, 16, or 8 octets or more may be established (e.g., using the LMP_encryption_mode_req and LMP_encryption_key_size_req between the controller of the first device and the controller of the second device as in the example of FIG. 22 or 23 and the LMP_accepted message in response thereto).

In the above-described examples, the operation of the host configuring the encryption key size information to the controller may be performed when a predetermined condition is satisfied.

The predetermined condition may be a case in which the host checks encryption key size information mapped to the corresponding application/profile/service/link/connection based on the identifier of the application/profile/service/link/connection (e.g. UUIDs, etc.). A mapping relationship between an identifier of an application/profile/service/link/connection and key size information may be preconfigured. Accordingly, when the use of a specific application/profile/service/link/connection is started, corresponding key size information may be configured.

The predetermined condition may be a case in which a user's confirmation is requested through the user interface as to whether to proceed with encryption key size configuration information for a specific application/profile/service/link/connection (or whether to launch a specific application/profile/service/link/connection), and the user's confirmation is performed through the user interface.

In the examples of the present disclosure described above, a method for configuring a key size supported by the controller is mainly described by defining and exchanging commands and events related to key size configuration between the profile/service layer of the first device, the host layer, and the controller layer, particularly between the host and the controller. However, the scope of the present disclosure is not limited thereto, and key size configuration may also be performed in the second device.

For example, the key size configuring for a predetermined unit (e.g., a combination of one or more of Profiles, Services, Links, and Connections) between the first and second devices may be performed between the host and the controller on the first device and between the host and the controller on the second device.

In addition, in the examples of the present disclosure, in an event in which the controller of each device transmits information on a key size that it can support to the host, it may further include one or more of information on a predetermined unit (e.g., a combination of one or more of Profiles, Services, Links, and Connections) or information on whether encryption is activated.

In the above-described examples, the exchange and configuring of information on the size of an encryption key between the host and the controller may be related to the configuration of link level encryption. That is, information on the encryption key size may be exchanged and set when link level encryption is applied. Therefore, if the information on the encryption key size is commonly or independently applied according to a predetermined unit (e.g., one or a plurality of combinations of profile, service, link, and connection), link level encryption setting is also the predetermined Depending on the unit, it may be included in what is commonly or independently applied. For example, when link level encryption is applied to a specific link, information on the size of an encryption key for the specific link may be exchanged and configured. As an additional example, when link level encryption is applied to all links related to a specific profile/service, information on the encryption key size may be exchanged and configured for all links related to the specific profile/service. For example, a predetermined unit (profile/service/link/connection) may correspond to BR/EDR type or LE type. For example, information on the link level encryption configuration and/or encryption key size may be configured separately from the BR/EDR type and the LE type, or may be configured in common between the BR/EDR type and the LE type.

Figure 28:
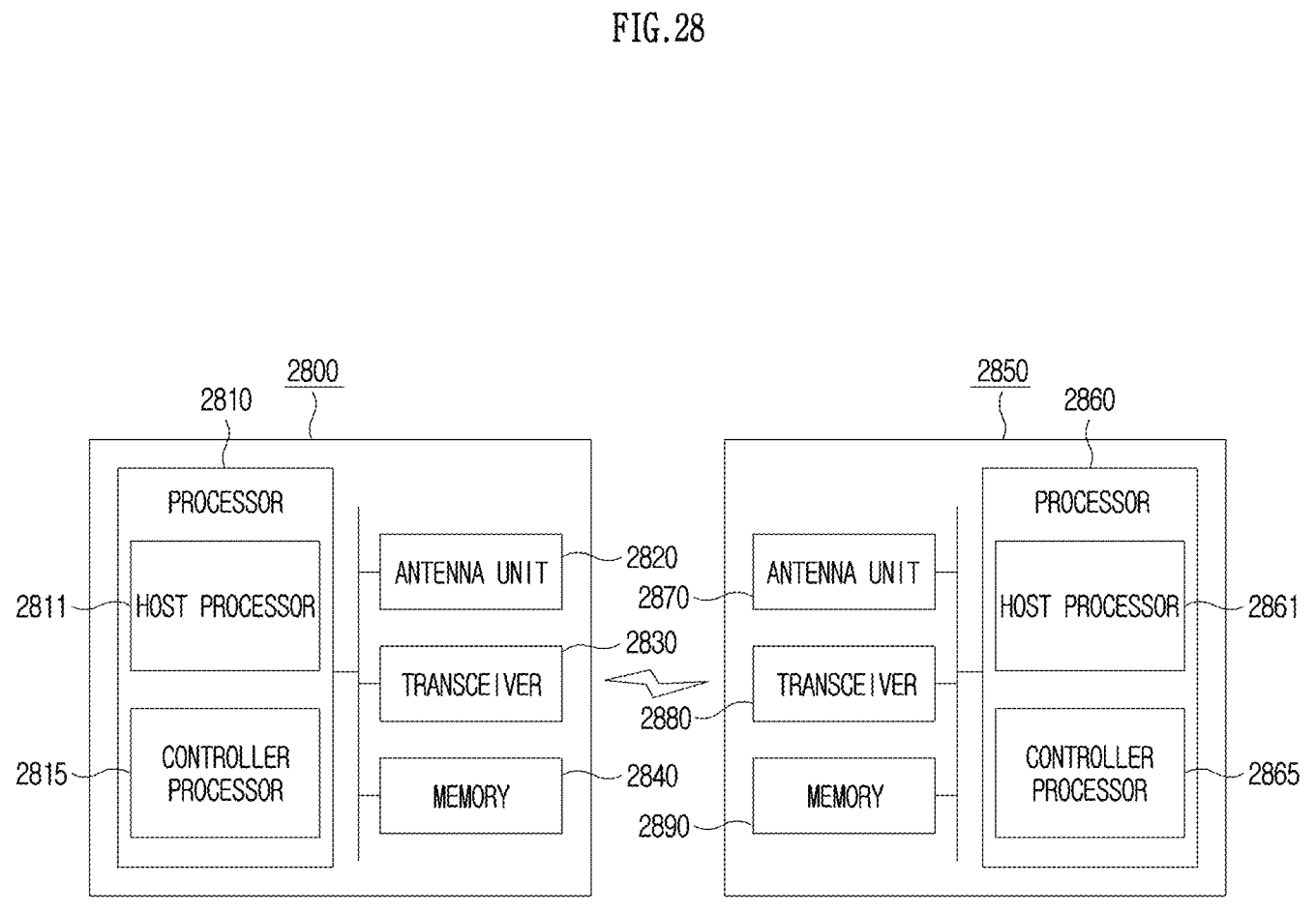

FIG. 28 is a diagram illustrating a configuration of the first device and the second device to which the present disclosure is applicable.

The first device 2800 may include a processor 2810, an antenna unit 2820, a transceiver 2830, and a memory 2840.

The processor 2810 may perform baseband-related signal processing and may include a host processor 2811 and a controller processor 2815. The host processor 2811 and the controller processor 2815 may exchange information through HCI. The host processor 2811 may process operations such as L2CAP, ATT, GATT, GAP, and LE profile layers. The controller processor 2815 may process operations such as LL and PHY layers. The processor 2810 may control the overall operation of the first device 2800 in addition to performing baseband-related signal processing.

Antenna unit 2820 may include one or more physical antennas. The transceiver 2830 may include RF (Radio Frequency) transmitter and RF receiver. The memory 2840 may store information processed by the processor 2810 and software, an operating system, and an application related to the operation of the first device 2800, and may include components such as a buffer and the like.

The processor 2810 of the first device 2800 may be configured to implement an operation of the first device (or, the audio source device, or encoding device) in the embodiments described in the present disclosure.

For example, the host processor 2811 of the processor 2810 of the first device 2800 may transmit a first message (command) including information on the minimum value of the encryption key size to the controller processing unit 2815.

The controller processing unit 2815 may transmit a second message (event) indicating an encryption change to the host processor 2811. The second message may include information on the size of the first encryption key.

The second device 2850 may include a processor 2860, an antenna unit 2870, transceiver 2880, and a memory 2890.

The processor 2860 may perform baseband-related signal processing and may include a host processor 2861 and a controller processor 2865. The host processor 2861 and the controller processor 2865 may exchange information through HCI. The host processor 2861 may process operations such as L2CAP, ATT, GATT, GAP, and LE profile layers. The controller processor 2865 may process operations of the LL layer, the PHY layer, and the like. The processor 2860 may control the overall operation of the second device 2860 in addition to performing baseband-related signal processing.

The antenna unit 2870 may include one or more physical antennas. The transceiver 2880 may include an RF transmitter and an RF receiver. The memory 2890 may store information processed by the processor 2860 and software, an operating system, and an application related to the operation of the second device 2850, and may include components such as a buffer and the like.

The processor 2860 of the second terminal device 2850 may be configured to implement the operation of the second device (or audio sink, or server device) in the embodiments described in the present disclosure.

For example, the host processor 2861 of the processor 2860 of the second device 2850 may transmit a first message (command) including information on the minimum value of the encryption key size to the controller processing unit 2865.

The controller processing unit 2865 may transmit a second message (event) indicating an encryption change to the host processor 2861. The second message may include information on the size of the first encryption key.

In the operation of the first device 2800 and the second device 2850, in the examples of the present disclosure, the descriptions of the source/encoding device and the sink/decoding device may be equally applied, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor(s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

What is claimed is:

1. A method performed by a first device in a wireless communication system, the method comprising:

sending, by a first host to a first controller via a first host controller interface (HCI), an HCI set minimum encryption key size command including a parameter specifying a minimum encryption key size; and receiving, by the first host from the first controller via the first HCI, an HCI encryption change event including a first parameter indicating that an encryption change has occurred, wherein the HCI encryption change event includes a second parameter specifying a size of a key used for an encryption, and the first controller does not negotiate a key size smaller than the minimum encryption key size, wherein the HCI encryption change event further includes a third parameter of an identifier for a connection between a first device and a second device, wherein the HCI encryption change event occurs on the first device to notify the first host when encryption has changed for the connection existing between the first device and the second device, and wherein, based on the first host specifying the minimum encryption key size that the first controller does not support, the first controller returns error information to the first host; wherein the HCI encryption change event further includes a fourth parameter on whether link level encryption is enabled or disabled;

wherein the link level encryption is enabled, with either E0 (Encryption 0) or AES-CCM (Advanced Encryption Standard-Cipher block Chaining-Message authentication code).

2. The method of claim 1, wherein based on the HCI set minimum encryption key size command is completed, an HCI command complete event indicating a success or a failure of the HCI set minimum encryption key size command is generated.

3. The method of claim 1, wherein the HCI encryption change event occurs on the second device to notify a second host when encryption has changed for the connection existing between the first device and the second device.

4. A first device in a wireless communication system, the first device comprising:

a transceiver for performing signal transmission and reception with second device; and a processor for controlling the transceiver and the first device;

wherein the processor is configured to:

send, by a first host to a first controller via a first host controller interface (HCI), an HCI set minimum encryption key size command including a parameter specifying a minimum encryption key size; and receive, by the first host from the first controller via the first HCI, an HCI encryption change event including a first parameter indicating that an encryption change has occurred, wherein the HCI encryption change event includes a second parameter specifying a size of a key used for an encryption, and the first controller does not negotiate a key size smaller than the minimum encryption key size, wherein the HCI encryption change event further includes a third parameter of an identifier for a connection between a first device and a second device, wherein the HCI encryption change event occurs on the first device to notify the first host when encryption has changed for the connection existing between the first device and the second device, and wherein, based on the first host specifying the minimum encryption key size that the first controller does not support, the first controller returns error information to the first host; wherein the HCI encryption change event further includes a fourth parameter on whether link level encryption is enabled or disabled;

wherein the link level encryption is enabled, with either E0 (Encryption 0) or AES-CCM (Advanced Encryption Standard-Cipher block Chaining-Message authentication code).

* * * * *